(12) United States Patent
Song et al.

(10) Patent No.: US 11,853,609 B2
(45) Date of Patent: Dec. 26, 2023

(54) POWER MODE CONTROL IN A MULTI-MEMORY DEVICE BASED ON QUEUE LENGTH

(71) Applicant: Micron Technology, Inc., Boise, ID (US)

(72) Inventors: Taeksang Song, San Jose, CA (US); Saira Samar Malik, Lafayette, IN (US); Chinnakrishnan Ballapuram, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/585,298

(22) Filed: Jan. 26, 2022

(65) Prior Publication Data

US 2022/0350535 A1   Nov. 3, 2022

Related U.S. Application Data

(60) Provisional application No. 63/181,065, filed on Apr. 28, 2021.

(51) Int. Cl.
*G06F 3/06* (2006.01)

(52) U.S. Cl.
CPC .......... *G06F 3/0659* (2013.01); *G06F 3/0625* (2013.01); *G06F 3/0656* (2013.01); *G06F 3/0679* (2013.01)

(58) Field of Classification Search
CPC .... G06F 3/0659; G06F 3/0625; G06F 3/0656; G06F 3/0679; G06F 1/3225; G06F 1/3275; G06F 3/0634; Y02D 10/00; G11C 5/147
See application file for complete search history.

(56) References Cited

U.S. PATENT DOCUMENTS

| | | | |
|---|---|---|---|
| 2017/0038973 A1* | 2/2017 | Takano | G06F 3/0625 |
| 2018/0074743 A1* | 3/2018 | Jeter | G06F 3/0653 |
| 2019/0114078 A1* | 4/2019 | Oh | G06F 3/0632 |
| 2021/0294509 A1* | 9/2021 | Iwata | G06F 3/0625 |
| 2022/0179585 A1* | 6/2022 | Muthiah | G06F 3/0625 |

\* cited by examiner

*Primary Examiner* — Michelle T Bechtold
(74) *Attorney, Agent, or Firm* — Holland & Hart LLP

(57) ABSTRACT

Methods, systems, and devices for power mode control in a multi-memory device are described. An apparatus may include a non-volatile memory and a volatile memory. The apparatus may operate the volatile memory in a first power mode and the non-volatile memory in a second power mode. The apparatus may transition the volatile memory from the first power mode to a third power mode based on a power mode command from a host device. The apparatus may transition the non-volatile memory from the second power mode to a fourth power mode that consumes less power than the second power mode irrespective of the command from the host device and based on a quantity of queued commands for the non-volatile memory being less than a threshold quantity.

23 Claims, 7 Drawing Sheets

POWER MODE CONTROL IN A MULTI-MEMORY DEVICE BASED ON QUEUE LENGTH

CROSS REFERENCE

The present application for patent claims priority to U.S. Provisional Patent Application No. 63/181,065 by Song et al., entitled "POWER MODE CONTROL IN A MULTI-MEMORY DEVICE", filed Apr. 28, 2021, assigned to the assignee hereof and expressly incorporated by reference in its entirety herein.

FIELD OF TECHNOLOGY

The following relates generally to one or more systems for memory and more specifically to power mode control in a multi-memory device.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state if disconnected from an external power source.

DETAILED DESCRIPTION

Figure 1:
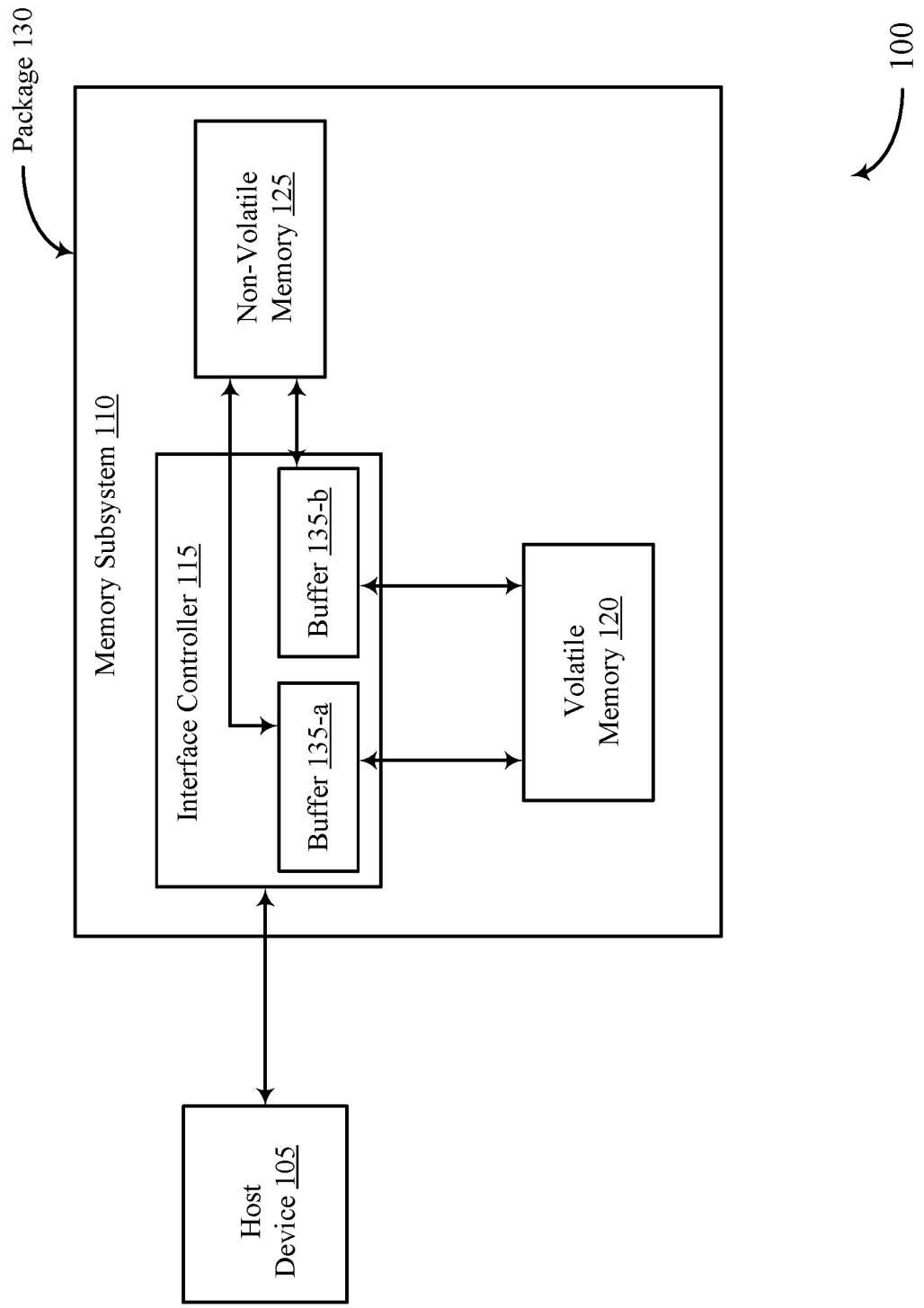
FIG. 1 illustrates an example of a system that supports power mode control in a multi-memory device in accordance with examples as disclosed herein.

A device, such as an electronic device, may include a non-volatile memory (e.g., a primary memory for storing information among other operations) and a volatile memory (e.g., a secondary memory) that may operate as a cache for the non-volatile memory. Such a configuration may allow the device to benefit from advantages of the non-volatile memory (e.g., non-volatility and persistent storage, high storage capacity, low power consumption) while maintaining compatibility with a host device through the volatile memory, among other aspects. The volatile memory and the non-volatile memory may, in some examples, support different power modes that provide different levels of functionality, consume different amounts of power, or have different exit latencies, among other differences. A host device may control the respective power modes of the volatile memory and the non-volatile memory as a unit by instructing the device to operate the volatile memory and the non-volatile memory in a same, particular power mode. But operating the volatile memory and the non-volatile memory in the same, particular power mode may waste power (e.g., if the memories have different traffic or access expectancies), among other disadvantages.

According to the techniques described herein, a device may conserve power, among other advantages, by selecting the power mode of a first memory, such as the non-volatile memory, independent of the power mode of the second memory, such as the volatile memory, and vice-versa. For example, the device may select the power mode of the volatile memory based on or in response to one or more power mode commands from the host device and may select the power mode of the non-volatile memory based on or in response to the quantity of commands queued for the non-volatile memory, among other factors or examples. In some examples, if the quantity of queued commands is less than a threshold quantity (e.g., zero, some value less than the threshold quantity), the device may change the power mode of the non-volatile memory from a relatively higher power mode to a lower power mode. In some examples, upon detecting the presence of a queued command (or upon detecting a threshold quantity of queued commands) for the non-volatile memory, the device may transition the non-volatile memory from the lower power mode to the relatively higher power mode. Thus, the power mode of the non-volatile memory may be controlled independent of the power mode of the volatile memory, which may allow the device to conserve power and operate more dynamically, among other advantages.

Features of the disclosure are initially described in the context of a system and a memory subsystem as described with reference to FIGS. 1 and 2. Features of the disclosure are described in the context of a device, as described with reference to FIG. 3, and process flows, as described with reference to FIGS. 4 and 5. These and other features of the disclosure are further illustrated by and described with reference to an apparatus diagram and flowcharts that relate to a dynamic scratchpad in a cache as described with reference to FIGS. 6-8.

FIG. 1 illustrates an example of a system 100 that supports power mode control in a multi-memory device in accordance with examples as disclosed herein. The system 100 may be included in an electronic device such a computer or phone. The system 100 may include a host device 105 and a memory subsystem 110. The host device 105 may be a processor or system-on-a-chip (SoC) that interfaces with the interface controller 115 as well as other components of the electronic device that includes the system 100. The memory subsystem 110 may store and provide access to electronic information (e.g., digital information, data) for the host device 105. The memory subsystem 110 may include an interface controller 115, a volatile memory 120, and a non-volatile memory 125. In some examples, the interface controller 115, the volatile memory 120, and the non-volatile memory 125 may be included in a same physical package such as a package 130. However, the interface controller 115, the volatile memory 120, and the non-volatile memory 125 may be disposed on different, respective dies (e.g., silicon dies).

The devices in the system 100 may be coupled by various conductive lines (e.g., traces, printed circuit board (PCB) routing, redistribution layer (RDL) routing) that may enable the communication of information (e.g., commands, addresses, data) between the devices. The conductive lines may make up channels, data buses, command buses, address buses, and the like.

The memory subsystem 110 may be configured to provide the benefits of the non-volatile memory 125 while maintaining compatibility with a host device 105 that supports protocols for a different type of memory, such as the volatile memory 120, among other examples. For example, the non-volatile memory 125 may provide benefits (e.g., relative to the volatile memory 120) such as non-volatility, higher capacity, or lower power consumption. But the host device 105 may be incompatible or inefficiently configured with various aspects of the non-volatile memory 125. For instance, the host device 105 may support voltages, access latencies, protocols, page sizes, etc. that are incompatible with the non-volatile memory 125. To compensate for the incompatibility between the host device 105 and the non-volatile memory 125, the memory subsystem 110 may be configured with the volatile memory 120, which may be compatible with the host device 105 and serve as a cache for the non-volatile memory 125. Thus, the host device 105 may use protocols supported by the volatile memory 120 while benefitting from the advantages of the non-volatile memory 125.

In some examples, the system 100 may be included in, or coupled with, a computing device, electronic device, mobile computing device, or wireless device. The device may be a portable electronic device. For example, the device may be a computer, a laptop computer, a tablet computer, a smartphone, a cellular phone, a wearable device, an internet-connected device, or the like. In some examples, the device may be configured for bi-directional wireless communication via a base station or access point. In some examples, the device associated with the system 100 may be capable of machine-type communication (MTC), machine-to-machine (M2M) communication, or device-to-device (D2D) communication. In some examples, the device associated with the system 100 may be referred to as a user equipment (UE), station (STA), mobile terminal, or the like.

The host device 105 may be configured to interface with the memory subsystem 110 using a first protocol (e.g., low-power double data rate (LPDDR)) supported by the interface controller 115. Thus, the host device 105 may, in some examples, interface with the interface controller 115 directly and the non-volatile memory 125 and the volatile memory 120 indirectly. In alternative examples, the host device 105 may interface directly with the non-volatile memory 125 and the volatile memory 120. The host device 105 may also interface with other components of the electronic device that includes the system 100. The host device 105 may be or include an SoC, a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In some examples, the host device 105 may be referred to as a host.

The interface controller 115 may be configured to interface with the volatile memory 120 and the non-volatile memory 125 on behalf of the host device 105 (e.g., based on or in response to one or more commands or requests issued by the host device 105). For instance, the interface controller 115 may facilitate the retrieval and storage of data in the volatile memory 120 and the non-volatile memory 125 on behalf of the host device 105. Thus, the interface controller 115 may facilitate data transfer between various subcomponents, such as between at least some of the host device 105, the volatile memory 120, or the non-volatile memory 125. The interface controller 115 may interface with the host device 105 and the volatile memory 120 using the first protocol and may interface with the non-volatile memory 125 using a second protocol supported by the non-volatile memory 125.

The non-volatile memory 125 may be configured to store digital information (e.g., data) for the electronic device that includes the system 100. Accordingly, the non-volatile memory 125 may include an array or arrays of memory cells and a local memory controller configured to operate the array(s) of memory cells. In some examples, the memory cells may be or include FeRAM cells (e.g., the non-volatile memory 125 may be FeRAM). The non-volatile memory 125 may be configured to interface with the interface controller 115 using the second protocol that is different than the first protocol used between the interface controller 115 and the host device 105. In some examples, the non-volatile memory 125 may have a longer latency for access operations than the volatile memory 120. For example, retrieving data from the non-volatile memory 125 may take longer than retrieving data from the volatile memory 120. Similarly, writing data to the non-volatile memory 125 may take longer than writing data to the volatile memory 120. In some examples, the non-volatile memory 125 may have a smaller page size than the volatile memory 120, as described herein.

The volatile memory 120 may be configured to operate as a cache for one or more components, such as the non-volatile memory 125. For example, the volatile memory 120 may store information (e.g., data) for the electronic device that includes the system 100. Accordingly, the volatile memory 120 may include an array or arrays of memory cells and a local memory controller configured to operate the array(s) of memory cells. In some examples, the memory cells may be or include DRAM cells (e.g., the volatile memory may be DRAM). The non-volatile memory 125 may be configured to interface with the interface controller 115 using the first protocol that is used between the interface controller 115 and the host device 105.

In some examples, the volatile memory 120 may have a shorter latency for access operations than the non-volatile memory 125. For example, retrieving data from the volatile memory 120 may take less time than retrieving data from the non-volatile memory 125. Similarly, writing data to the volatile memory 120 may take less time than writing data to the non-volatile memory 125. In some examples, the volatile memory 120 may have a larger page size than the non-volatile memory 125. For instance, the page size of volatile memory 120 may be 2 kilobytes (2 kB) and the page size of non-volatile memory 125 may be 64 bytes (64 B) or 128 bytes (128 B).

Although the non-volatile memory 125 may be a higher-density memory than the volatile memory 120, accessing the non-volatile memory 125 may take longer than accessing the volatile memory 120 (e.g., due to different architectures and protocols, among other reasons). Accordingly, operating the volatile memory 120 as a cache may reduce latency in the system 100. As an example, an access request for data from the host device 105 may be satisfied relatively quickly by retrieving the data from the volatile memory 120 rather than from the non-volatile memory 125. To facilitate operation of the volatile memory 120 as a cache, the interface controller 115 may include multiple buffers 135. The buffers 135 may be disposed on the same die as the interface controller 115 and may be configured to temporarily store data for transfer between the volatile memory 120, the non-volatile memory 125, or the host device 105 (or any combination thereof) during one or more access operations (e.g., storage and retrieval operations).

An access operation may also be referred to as an access process or access procedure and may involve one or more sub-operations that are performed by one or more of the components of the memory subsystem 110. Examples of access operations may include storage operations in which data provided by the host device 105 is stored (e.g., written to) in the volatile memory 120 or the non-volatile memory 125 (or both), and retrieval operations in which data requested by the host device 105 is obtained (e.g., read) from the volatile memory 120 or the non-volatile memory 125 and is returned to the host device 105.

To store data in the memory subsystem 110, the host device 105 may initiate a storage operation (or "storage process") by transmitting a storage command (also referred to as a storage request, a write command, or a write request) to the interface controller 115. The storage command may target a set of non-volatile memory cells in the non-volatile memory 125. In some examples, a set of memory cells may also be referred to as a portion of memory. The host device 105 may also provide the data to be written to the set of non-volatile memory cells to the interface controller 115. The interface controller 115 may temporarily store the data in the buffer 135-a. After storing the data in the buffer 135-a, the interface controller 115 may transfer the data from the buffer 135-a to the volatile memory 120 or the non-volatile memory 125 or both. In write-through mode, the interface controller 115 may transfer the data to both the volatile memory 120 and the non-volatile memory 125. In write-back mode, the interface controller 115 may simply transfer the data to the volatile memory 120 (with the data being transferred to the non-volatile memory 125 during a later eviction process).

In either mode, the interface controller 115 may identify an appropriate set of one or more volatile memory cells in the volatile memory 120 for storing the data associated with the storage command. To do so, the interface controller 115 may implement set-associative mapping in which each set of one or more non-volatile memory cells in the non-volatile memory 125 may be mapped to multiple sets (e.g., rows) of volatile memory cells in the volatile memory 120. For instance, the interface controller 115 may implement n-way associative mapping which allows data from a set of non-volatile memory cells to be stored in one of n sets of volatile memory cells in the volatile memory 120. Thus, the interface controller 115 may manage the volatile memory 120 as a cache for the non-volatile memory 125 by referencing the n sets of volatile memory cells associated with a targeted set of non-volatile memory cells. As used herein, a "set" of objects may refer to one or more of the objects unless otherwise described or noted. Although described with reference to set-associative mapping, the interface controller 115 may manage the volatile memory 120 as a cache by implementing one or more other types of mapping such as direct mapping or associative mapping, among other examples.

After determining which n sets of volatile memory cells are associated with the targeted set of non-volatile memory cells, the interface controller 115 may store the data in one or more of the n sets of volatile memory cells. This way, a subsequent retrieval command from the host device 105 for the data can be efficiently satisfied by retrieving the data from the lower-latency volatile memory 120 instead of retrieving the data from the higher-latency non-volatile memory 125. The interface controller 115 may determine which of the n sets of the volatile memory 120 store the data based on or in response to one or more parameters associated with the data stored in the n sets of the volatile memory 120, such as the validity, age, or modification status of the data. Thus, a storage command by the host device 105 may be wholly (e.g., in write-back mode) or partially (e.g., in write-through mode) satisfied by storing the data in the volatile memory 120. To track the data stored in the volatile memory 120, the interface controller 115 may store for one or more sets of volatile memory cells (e.g., for each set of volatile memory cells) a tag address that indicates the non-volatile memory cells with data stored in a given set of volatile memory cells.

To retrieve data from the memory subsystem 110, the host device 105 may initiate a retrieval operation (also referred to as a retrieval process) by transmitting a retrieval command (also referred to as a retrieval request, a read command, or a read request) to the interface controller 115. The retrieval command may target a set of one or more non-volatile memory cells in the non-volatile memory 125. Upon receiving the retrieval command, the interface controller 115 may check for the requested data in the volatile memory 120. For instance, the interface controller 115 may check for the requested data in the n sets of volatile memory cells associated with the targeted set of non-volatile memory cells. If one of the n sets of volatile memory cells stores the requested data (e.g., stores data for the targeted set of non-volatile memory cells), the interface controller 115 may transfer the data from the volatile memory 120 to the buffer 135-a (e.g., in response to determining that one of the n sets of volatile memory cells stores the requested data, as described in FIGS. 4 and 5) so that it can be transmitted to the host device 105.

In general, the term "hit" may be used to refer to the scenario where the volatile memory 120 stores data targeted by the host device 105. If the n sets of one or more volatile memory cells do not store the requested data (e.g., the n sets of volatile memory cells store data for a set of non-volatile memory cells other than the targeted set of non-volatile memory cells), the interface controller 115 may transfer the requested data from the non-volatile memory 125 to the buffer 135-a (e.g., in response to determining that then sets of volatile memory cells do not store the requested data, as described with reference to FIGS. 4 and 5) so that it can be transmitted to the host device 105. In general, the term "miss" may be used to refer to the scenario where the volatile memory 120 does not store data targeted by the host device 105.

More specifically, a write hit may refer to the scenario where data in the volatile memory 120 is associated with (e.g., matches data stored at) a non-volatile memory address targeted by a write command from the host device; whereas a write miss may refer to the scenario where data associated with the non-volatile memory address is absent from the volatile memory 120.

In a miss scenario, after transferring the requested data to the buffer 135-a, the interface controller 115 may transfer the requested data from the buffer 135-a to the volatile memory 120 so that subsequent read requests for the data can be satisfied by the volatile memory 120 instead of the non-volatile memory 125. For example, the interface controller 115 may store the data in one of the n sets of volatile memory cells associated with the targeted set of non-volatile memory cells. But then sets of volatile memory cells may already be storing data for other sets of non-volatile memory cells. So, to preserve this other data, the interface controller 115 may transfer the other data to the buffer 135-b so that it can be transferred to the non-volatile memory 125 for storage. Such a process may be referred to as "eviction" and the data transferred from the volatile memory 120 to the buffer 135-b may be referred to as "victim" data. In some cases, the interface controller 115 may transfer a subset of the victim data from the buffer 135-b to the non-volatile memory 125. For example, the interface controller 115 may transfer one or more subsets of victim data that have changed since the data was initially stored in the non-volatile memory 125. Data that is inconsistent between the volatile memory 120 and the non-volatile memory 125 (e.g., due to an update in one memory and not the other) may be referred to in some cases as "modified" or "dirty" data. In some examples (e.g., if interface controller operates in one mode such as a write-back mode), dirty data may be data that is present in the volatile memory 120 but not present in the non-volatile memory 125.

So, the interface controller 115 may perform an eviction procedure to save data from the volatile memory 120 to the non-volatile memory 125 if the volatile memory 120 is full (e.g., to make space for new data in the volatile memory 120). In some examples, the interface controller 115 may perform a "fill" procedure in which data from the non-volatile memory 125 is saved to the volatile memory 120. The interface controller 115 may perform a fill procedure in the event of a miss (e.g., to populate the volatile memory 120 with relevant data). For example, in the event of a read miss, which occurs if a read command from the host device 105 targets data absent from the volatile memory 120, the interface controller 115 may retrieve the data requested by the read command and, in addition to returning it to the host device, store it in the volatile memory 120 (e.g., so that the data can be retrieved quickly in the future).

Thus, the memory subsystem 110 may satisfy (or "fulfill") requests (e.g., read commands, write commands) from the host device 105 using either the volatile memory 120 or the non-volatile memory 125, depending on the hit or miss status of the request. For example, in the event of a read miss, the read command from the host device 105 may be satisfied by the non-volatile memory 125, which means that the data returned from the host device 105 may originate from the non-volatile memory 125. And in the event of a read hit, the read command from the host device 105 may be satisfied by the volatile memory 120, which means that the data returned from the host device 105 may originate from the volatile memory 120. In some examples, the ratio of hits to misses ("hit-to-miss ratio") may be relatively high (e.g., the hit percentage may be around 85% whereas the miss percentage may be around 15%).

The volatile memory 120 and the non-volatile memory 125 may support different power modes that provide different levels of functionality, consume different amounts of power, or have different exit latencies, among other differences. For example, the volatile memory 120 may support an active mode during which the volatile memory 120 executes commands in response to functional commands from the host device 105. The active mode may consume the most power relative to other power modes of the volatile memory 120. The volatile memory 120 may also support one or more standby (or "idle") modes during which the volatile memory 120 is partially powered down and awaiting commands from the host device 105. The standby modes may consume intermediate amounts of power relative to other power modes of the volatile memory 120. Additionally, the volatile memory 120 may support a low power mode (or "deep sleep" mode) during which the volatile 120 memory is mostly or completely powered down. The low power mode may consume the least power relative to other power modes of the volatile memory 120. The non-volatile memory 125 may support similar power modes adapted as appropriate for the non-volatile memory 125. Other power modes for the volatile memory 120 and the non-volatile memory 125 are contemplated.

In some examples, using other different techniques the host device 105 may control the power modes of the volatile memory 120 and the non-volatile memory 125 as a unit based on the traffic or access expectancies of the host device 105. For example, if the host device 105 does not expect to access the memory subsystem 110 for a threshold duration of time, the host device 105 may instruct the memory subsystem 110 to operate both the volatile memory 120 and the non-volatile memory 125 in the low power mode to conserve power. But using other different techniques that rely on the host device 105 to transition the non-volatile memory 125 to the low power mode may waste power in scenarios where the non-volatile memory 125 is ready to enter low power mode before the host device 105 recognizes a break in traffic or access. Put another way, using other different techniques to control the power modes of the memories as a unit and based exclusively on the traffic or access expectancies of the host device 105 may result in the non-volatile memory 125 belatedly transitioning to the low power mode, resulting in excess power consumption.

As another example, using other different techniques if the host device 105 expects to imminently access the memories, the host device 105 may instruct the memory subsystem 110 to operate the volatile memory 120 and the non-volatile memory 125 in a standby mode so that the memories are able to quickly provide access upon receipt of a functional command (e.g., an activate command, a pre-charge command, a read command, a write command) from the host device 105. But relying on the host device 105 to transition the non-volatile memory 125 to the standby mode using other different techniques may waste power in the scenario where the non-volatile memory 125 goes un-accessed for a period of time (e.g., because the standby mode may consume more power than other modes supported by the memories, such as the low power mode). Put another way, using other different techniques to control the power modes of the memories as a unit and based exclusively on the traffic or access expectancies of the host device 105 may result in the non-volatile memory 125 prematurely transitioning from a lower power mode to the standby mode, resulting in excess power consumption. In systems where the hit-to-miss ratio is high, the described power consumption issues may be particularly exacerbated.

In contrast, according to the techniques described the memory subsystem 110 may reduce power consumption by controlling the power modes of the memories independent of each other. To ensure that the volatile memory 120 is able to provide access in a manner expected by the host device 105, the memory subsystem 110 may control the power mode of a first memory (e.g., the volatile memory 120) based on (e.g., in response to) power mode commands from the host device 105. A power mode command may refer to a command that indicates a power mode to be used. To prevent a second memory, such as the non-volatile memory 125, from belatedly or prematurely entering a power mode, the memory subsystem 110 may control the power mode of second memory, such as the non-volatile memory 125, based on or in response to the presence or absence of queued commands for the second memory, such as the non-volatile memory 125 (and irrespective of the power mode of the first memory such as the volatile memory 120), among other factors. For example, the second memory, such as the non-volatile memory 125, may transition to the low power mode if no commands are queued for the second memory, such as the non-volatile memory 125, and may transition to the standby mode (or other higher power mode) if one or more commands are queued for the second memory, such as the non-volatile memory 125. Although described as different types of memories, in some examples, the first and second memories may be the same type of memory (e.g., both volatile memories or both non-volatile memories).

The system 100 may include any quantity of non-transitory computer readable media that support power mode control as described herein. For example, the host device 105, the interface controller 115, the volatile memory 120, or the non-volatile memory 125 may include or otherwise may access one or more non-transitory computer readable media storing instructions (e.g., firmware) for performing the functions ascribed herein to the host device 105, the interface controller 115, the volatile memory 120, or the non-volatile memory 125. For example, such instructions, if executed by the host device 105 (e.g., by a host device controller), by the interface controller 115, by the volatile memory 120 (e.g., by a local controller), or by the non-volatile memory 125 (e.g., by a local controller), may cause the host device 105, the interface controller 115, the volatile memory 120, or the non-volatile memory 125 to perform associated functions as described herein.

Figure 2:
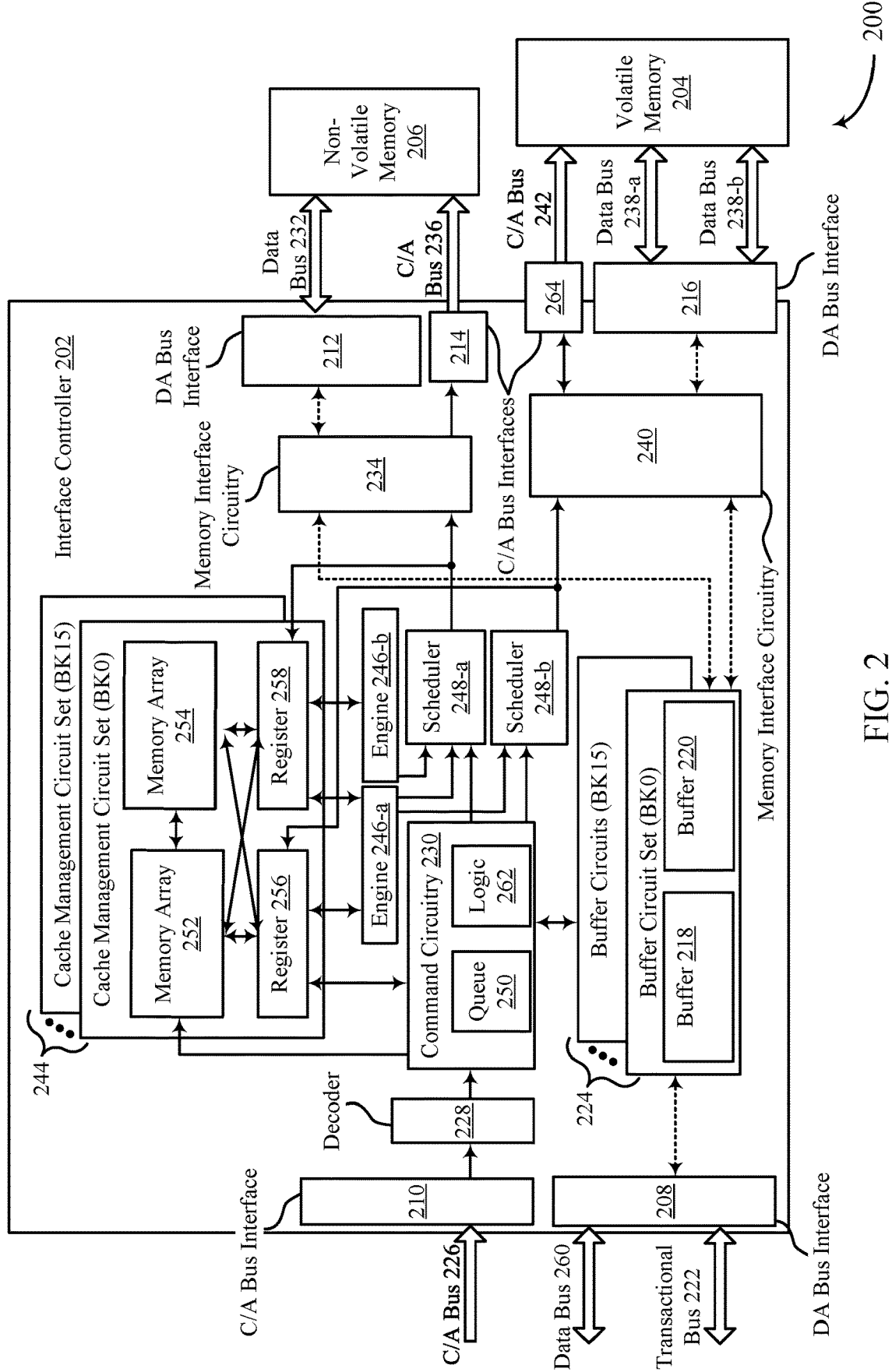
FIG. 2 illustrates an example of a memory subsystem that supports power mode control in a multi-memory device in accordance with examples as disclosed herein.

FIG. 2 illustrates an example of a memory subsystem 200 that supports power mode control in a multi-memory device in accordance with examples as disclosed herein. The memory subsystem 200 may be an example of the memory subsystem 110 described with reference to FIG. 1. Accordingly, the memory subsystem 200 may interact with a host device as described with reference to FIG. 1. The memory subsystem 200 may include an interface controller 202, a volatile memory 204, and a non-volatile memory 206, which may be examples of the interface controller 115, the volatile memory 120, and the non-volatile memory 125, respectively, as described with reference to FIG. 1. Thus, the interface controller 202 may interface with the volatile memory 204 and the non-volatile memory 206 on behalf of the host device as described with reference to FIG. 1. For example, the interface controller 202 may operate the volatile memory 204 as a cache for the non-volatile memory 206. Operating the volatile memory 204 as the cache may allow subsystem to provide the benefits of the non-volatile memory 206 (e.g., non-volatile, high-density storage) while maintaining compatibility with a host device that supports a different protocol than the non-volatile memory 206.

In FIG. 2, dashed lines between components represent the flow of data or communication paths for data and solid lines between components represent the flow of commands or communication paths for commands. In some cases, the memory subsystem 200 is one of multiple similar or identical subsystems that may be included in an electronic device. Each subsystem may be referred to as a slice and may be associated with a respective channel of a host device in some examples.

The non-volatile memory 206 may be configured to operate as a main memory (e.g., memory for long-term data storage) for a host device. In some cases, the non-volatile memory 206 may include one or more arrays of FeRAM cells. Each FeRAM cell may include a selection component and a ferroelectric capacitor and may be accessed by applying appropriate voltages to one or more access lines such as word lines, plates lines, and digit lines. In some examples, a subset of FeRAM cells coupled with to an activated word line may be sensed, for example concurrently or simultaneously, without having to sense all FeRAM cells coupled with the activated word line. Accordingly, a page size for an FeRAM array may be different than (e.g., smaller than) a DRAM page size. In the context of a memory device, a page may refer to the memory cells in a row (e.g., a group of the memory cells that have a common row address) and a page size may refer to the quantity of memory cells or column addresses in a row, or the quantity of column addresses accessed during an access operation. Alternatively, a page size may refer to a size of data handled by various interfaces or the amount of data a row is capable of storing. In some cases, different memory device types may have different page sizes. For example, a DRAM page size (e.g., 2 kB) may be a superset of a non-volatile memory (e.g., FeRAM) page size (e.g., 64 B).

A smaller page size of an FeRAM array may provide various efficiency benefits, as an individual FeRAM cell may need more power to read or write than an individual DRAM cell. For example, a smaller page size for an FeRAM array may facilitate effective energy usage because a smaller quantity of FeRAM cells may be activated if an associated change in information is minor. In some examples, the page size for an array of FeRAM cells may vary, for example dynamically (e.g., during operation of the array of FeRAM cells) depending on the nature of data and command utilizing FeRAM operation.

Although an individual FeRAM cell may need more power to read or write than an individual DRAM cell, an FeRAM cell may maintain a stored logic state for an extended period of time in the absence of an external power source, as the ferroelectric material in the FeRAM cell may maintain a non-zero electric polarization in the absence of an electric field. Therefore, including an FeRAM array in the non-volatile memory 206 may provide power and efficiency benefits relative to volatile memory cells (e.g., DRAM cells in the volatile memory 204), as it may reduce or eliminate constraints to perform refresh operations.

The volatile memory 204 may be configured to operate as a cache for the non-volatile memory 206. In some cases, the volatile memory 204 may include one or more arrays of DRAM cells. Each DRAM cell may include a capacitor that includes a dielectric material to store a charge representative of the programmable state. The memory cells of the volatile memory 204 may be logically grouped or arranged into one or more memory banks (as referred to herein as "banks"). For example, volatile memory 204 may include sixteen banks. The memory cells of a bank may be arranged in a grid or an array of intersecting columns and rows and each memory cell may be accessed or refreshed by applying appropriate voltages to the digit line (e.g., column line) and word line (e.g., row line) for that memory cell. The rows of a bank may be referred to pages, and the page size may refer to the quantity of columns or memory cells in a row (and thus, the amount of data a row is capable of storing). As noted, the page size of the volatile memory 204 may be different than (e.g., larger than) the page size of the non-volatile memory 206.

The interface controller 202 may include various circuits for interfacing (e.g., communicating) with other devices, such as a host device, the volatile memory 204, and the non-volatile memory 206. For example, the interface controller 202 may include a data (DA) bus interface 208, a command and address (C/A) bus interface 210, a data bus interface 212, a C/A bus interface 214, a data bus interface 216, and a C/A bus interface 264. The data bus interfaces may support the communication of information using one or more communication protocols. For example, the data bus interface 208, the C/A bus interface 210, the data bus interface 216, and the C/A bus interface 264 may support information that is communicated using a first protocol (e.g., LPDDR signaling), whereas the data bus interface 212 and the C/A bus interface 214 may support information communicated using a second protocol. Thus, the various bus interfaces coupled with the interface controller 202 may support different amounts of data or data rates.

The data bus interface 208 may be coupled with the data bus 260, the transactional bus 222, and the buffer circuitry 224. The data bus interface 208 may be configured to transmit and receive data over the data bus 260 and control information (e.g., acknowledgements/negative acknowledgements) or metadata over the transactional bus 222. The data bus interface 208 may also be configured to transfer data between the data bus 260 and the buffer circuitry 224. The data bus 260 and the transactional bus 222 may be coupled with the interface controller 202 and the host device such that a conductive path is established between the interface controller 202 and the host device. In some examples, the pins of the transactional bus 222 may be referred to as data mask inversion (DMI) pins. Although shown with one data bus 260 and one transactional bus 222, there may be any quantity of data buses 260 and any quantity of transactional buses 222 coupled with one or more data bus interfaces 208.

The C/A bus interface 210 may be coupled with the C/A bus 226 and the decoder 228. The C/A bus interface 210 may be configured to transmit and receive commands and addresses over the C/A bus 226. The commands and addresses received over the C/A bus 226 may be associated with data received or transmitted over the data bus 260. The C/A bus interface 210 may also be configured to transmit commands and addresses to the decoder 228 so that the decoder 228 can decode the commands and relay the decoded commands and associated addresses to the command circuitry 230.

The data bus interface 212 may be coupled with the data bus 232 and the memory interface circuitry 234. The data bus interface 212 may be configured to transmit and receive data over the data bus 232, which may be coupled with the non-volatile memory 206. The data bus interface 212 may also be configured to transfer data between the data bus 232 and the memory interface circuitry 234. The C/A bus interface 214 may be coupled with the C/A bus 236 and the memory interface circuitry 234. The C/A bus interface 214 may be configured to receive commands and addresses from the memory interface circuitry 234 and relay the commands and the addresses to the non-volatile memory 206 (e.g., to a local controller of the non-volatile memory 206) over the C/A bus 236. The commands and the addresses transmitted over the C/A bus 236 may be associated with data received or transmitted over the data bus 232. The data bus 232 and the C/A bus 236 may be coupled with the interface controller 202 and the non-volatile memory 206 such that conductive paths are established between the interface controller 202 and the non-volatile memory 206.

The data bus interface 216 may be coupled with the data buses 238 (e.g., data bus 238-*a*, data bus 238-*b*) and the memory interface circuitry 240. The data bus interface 216 may be configured to transmit and receive data over the data buses 238, which may be coupled with the volatile memory 204. The data bus interface 216 may also be configured to transfer data between the data buses 238 and the memory interface circuitry 240. The C/A bus interface 264 may be coupled with the C/A bus 242 and the memory interface circuitry 240. The C/A bus interface 264 may be configured to receive commands and addresses from the memory interface circuitry 240 and relay the commands and the addresses to the volatile memory 204 (e.g., to a local controller of the volatile memory 204) over the C/A bus 242. The commands and addresses transmitted over the C/A bus 242 may be associated with data received or transmitted over the data buses 238. The data bus 238 and the C/A bus 242 may be coupled with the interface controller 202 and the volatile memory 204 such that conductive paths are established between the interface controller 202 and the volatile memory 204.

In addition to buses and bus interfaces for communicating with coupled devices, the interface controller 202 may include circuitry for operating the non-volatile memory 206 as a main memory and the volatile memory 204 as a cache. For example, the interface controller 202 may include command circuitry 230, buffer circuitry 224, cache management circuitry 244, one or more engines 246, and one or more schedulers 248.

The command circuitry 230 may be coupled with the buffer circuitry 224, the decoder 228, the cache management circuitry 244, and the schedulers 248, among other components. The command circuitry 230 may be configured to receive command and address information from the decoder 228 and store the command and address information in the queue 250. The command circuitry 230 may include logic 262 that processes command information (e.g., from a host device) and storage information from other components (e.g., the cache management circuitry 244, the buffer circuitry 224) and uses that information to generate one or more commands for the schedulers 248. The command circuitry 230 may also be configured to transfer address information (e.g., address bits) to the cache management circuitry 244. In some examples, the logic 262 may be a circuit configured to operate as a finite state machine (FSM).

The buffer circuitry 224 may be coupled with the data bus interface 208, the command circuitry 230, the memory interface circuitry 234, and the memory interface circuitry 234. The buffer circuitry 224 may include a set of one or more buffer circuits for at least some banks, if not each bank, of the volatile memory 204. The buffer circuitry 224 may also include components (e.g., a memory controller) for accessing the buffer circuits. In one example, the volatile memory 204 may include sixteen banks and the buffer circuitry 224 may include sixteen sets of buffer circuits. Each set of the buffer circuits may be configured to store data from or for (or both) a respective bank of the volatile memory 204. As an example, the buffer circuit set for bank 0 (BK0) may be configured to store data from or for (or both) the first bank of the volatile memory 204 and the buffer circuit for bank 15 (BK15) may be configured to store data from or for (or both) the sixteenth bank of the volatile memory 204.

Each set of buffer circuits in the buffer circuitry 224 may include a pair of buffers. The pair of buffers may include one buffer (e.g., an open page data (OPD) buffer) configured to store data targeted by an access command (e.g., a write command or read command) from the host device and another buffer (e.g., a victim page data (VPD) buffer) configured to store data for an eviction process that results from the access command. For example, the buffer circuit set for BK0 may include the buffer 218 and the buffer 220, which may be examples of buffer 135-a and 135-b, respectively. The buffer 218 may be configured to store BK0 data that is targeted by an access command from the host device. And the buffer 220 may be configured to store data that is transferred from BK0 as part of an eviction process triggered by the access command. Each buffer in a buffer circuit set may be configured with a size (e.g., storage capacity) that corresponds to a page size of the volatile memory 204. For example, if the page size of the volatile memory 204 is 2 kB, the size of each buffer may be 2 kB. Thus, the size of the buffer may be equivalent to the page size of the volatile memory 204 in some examples.

The cache management circuitry 244 may be coupled with the command circuitry 230, the engines 246, and the schedulers 248, among other components. The cache management circuitry 244 may include a cache management circuit set for one or more banks (e.g., each bank) of volatile memory. As an example, the cache management circuitry 244 may include sixteen cache management circuit sets for BK0 through BK15. Each cache management circuit set may include two memory arrays that may be configured to store storage information for the volatile memory 204. As an example, the cache management circuit set for BK0 may include a memory array 252 (e.g., a Cache DRAM (CDRAM) Tag Array (CDT-TA)) and a memory array 254 (e.g., a CDRAM Valid (CDT-V) array), which may be configured to store storage information for BK0. The memory arrays may also be referred to as arrays or buffers in some examples. In some cases, the memory arrays may be or include volatile memory cells, such as static RAM (SRAM) cells.

Storage information (or "metadata") may include content information, validity information, or dirty information (or any combination thereof) associated with the volatile memory 204, among other examples. Content information (which may also be referred to as tag information or address information) may indicate which data is stored in a set of volatile memory cells. For example, the content information (e.g., a tag address) for a row of the volatile memory 204 may indicate which set of one or more non-volatile memory cells currently has data stored in the row. As noted, validity information may indicate whether the data stored in a set of volatile memory cells is actual data (e.g., data having an intended order or form) or placeholder data (e.g., data being random or dummy, not having an intended or important order). And dirty information may indicate whether the data stored in a set of one or more volatile memory cells of the volatile memory 204 is different than corresponding data stored in a set of one or more non-volatile memory cells of the non-volatile memory 206. For example, dirty information may indicate whether data stored in a set of volatile memory cells has been updated relative to data stored in the non-volatile memory 206.

The memory array 252 may include memory cells that store storage information (e.g., tag information, validity information, dirty information) for an associated bank (e.g., BK0) of the volatile memory 204. The storage information may be stored on a per-row basis (e.g., there may be respective storage information for each row of the associated non-volatile memory bank). The interface controller 202 may check for requested data in the volatile memory 204 by referencing the storage information in the memory array 252. For instance, the interface controller 202 may receive, from a host device, a retrieval command for data in a set of non-volatile memory cells in the non-volatile memory 206. The interface controller 202 may use a set of one or more address bits (e.g., a set of row address bits) targeted by the access request to reference the storage information in the memory array 252. For instance, using set-associative mapping, the interface controller 202 may reference the content information in the memory array 252 to determine which set of volatile memory cells, if any, stores the requested data.

In addition to storing content information for volatile memory cells, the memory array 252 may also store validity information that indicates whether the data in a set of volatile memory cells is actual data (also referred to as valid data) or random data (also referred to as invalid data). For example, the volatile memory cells in the volatile memory 204 may initially store random data and continue to do so until the volatile memory cells are written with data from a host device or the non-volatile memory 206. To track which data is valid, the memory array 252 may be configured to set a bit for each set (e.g., row) of volatile memory cells if actual data is stored in that set of volatile memory cells. This bit may be referred to a validity bit or a validity flag. As with the content information, the validity information stored in the memory array 252 may be stored on a per-row basis. Thus, each validity bit may indicate the validity of data stored in an associated row in some examples.

In some examples, the memory array 252 may store dirty information that indicates whether a set (e.g., row) of volatile memory cells stores any dirty data. Like the validity information, the dirty information stored in the memory array 252 may be stored on a per-row basis.

The memory array 254 may be similar to the memory array 252 and may also include memory cells that store storage information for a bank (e.g., BK0) of the volatile memory 204 that is associated with the memory array 252. For example, the memory array 254 may store validity information and dirty information for a bank of the volatile memory 204. However, the storage information stored in the memory array 254 may be stored on a sub-block basis as opposed to a per-row basis. For example, the validity information stored in the memory cells of the memory array 254 may indicate the validity of data for subsets of volatile memory cells in a row of the volatile memory 204.

As an example, the validity information in the memory array 254 may indicate the validity of each subset (e.g., 32 B or 64 B) of data stored in row of BK0 of the volatile memory 204. Similarly, the dirty information stored in the memory cells of the memory array 254 may indicate which subsets of volatile memory cells in a row of the volatile memory 204 store dirty data. For instance, the dirty information in the memory array 254 may indicate the dirty status of each subset (e.g., 32 B or 64 B) of data stored in row of BK0 of the volatile memory 204. Storing storage information (e.g., tag information, validity information) on a per-row basis in the memory array 252 may allow the interface controller 202 to determine whether there is a hit or whether there is a miss for data in the volatile memory 204. Storing storage information (e.g., validity information, dirty information) on a sub-block basis in the memory array 254 may allow the interface controller 202 to determine which one or more subsets of data to return to the host device (e.g., during a retrieval process) and which one or more subsets of data to preserve in the non-volatile memory 206 (e.g., during an eviction process).

Each cache management circuit set may also include a respective pair of registers coupled with the command circuitry 230, the engines 246, the memory interface circuitry 234, the memory interface circuitry 240, and the memory arrays for that cache management circuit set, among other components. For example, a cache management circuit set may include a first register (e.g., a register 256 which may be an open page tag (OPT) register) configured to receive storage information (e.g., one or more bits of tag information, validity information, or dirty information, other information, or any combination) from the memory array 252 or the scheduler 248-b or both. The cache management circuitry set may also include a second register (e.g., a register 258 which may be a victim page tag (VPT) register) configured to receive storage information (e.g., validity information or dirty information or both) from the memory array 254 and the scheduler 248-a or both. The information in the register 256 and the register 258 may be transferred to the command circuitry 230 and the engines 246 to enable decision-making by these components. For example, the command circuitry 230 may issue commands for reading the non-volatile memory 206 or the volatile memory 204 based on or in response to storage information in the register 256, or the register 258, or both.

The engine 246-a may be coupled with the register 256, the register 258, and the schedulers 248. The engine 246-a may be configured to receive storage information from various components and issue commands to the schedulers 248 based on the storage information. For example, if the interface controller 202 is in a first mode such as a write-through mode, the engine 246-a may issue commands to the scheduler 248-b and in response the scheduler 248-b to initiate or facilitate the transfer of data from the buffer 218 to both the volatile memory 204 and the non-volatile memory 206. Alternatively, if the interface controller 202 is in a second mode such as a write-back mode, the engine 246-a may issue commands to the scheduler 248-b and in response the scheduler 248-b may initiate or facilitate the transfer of data from the buffer 218 to the volatile memory 204. In the event of a write-back operation, the data stored in the volatile memory 204 may eventually be transferred to the non-volatile memory 206 during a subsequent eviction process.

The engine 246-b may be coupled with the register 258 and the scheduler 248-a. The engine 246-b may be configured to receive storage information from the register 258 and issue commands to the scheduler 248-a based on the storage information. For instance, the engine 246-b may issue commands to the scheduler 248-a to initiate or facilitate transfer of dirty data from the buffer 220 to the non-volatile memory 206 (e.g., as part of an eviction process). If the buffer 220 holds a set of data transferred from the volatile memory 204 (e.g., victim data), the engine 246-b may indicate which one or more subsets (e.g., which 64 B) of the set of data in the buffer 220 should be transferred to the non-volatile memory 206.

The scheduler 248-a may be coupled with various components of the interface controller 202 and may facilitate accessing the non-volatile memory 206 by issuing commands to the memory interface circuitry 234. The commands issued by the scheduler 248-a may be based on or in response to commands from the command circuitry 230, the engine 246-a, the engine 246-b, or a combination of these components. Similarly, the scheduler 248-b may be coupled with various components of the interface controller 202 and may facilitate accessing the volatile memory 204 by issuing commands to the memory interface circuitry 240. The commands issued by the scheduler 248-b may be based on or in response to commands from the command circuitry 230 or the engine 246-a, or both.

The memory interface circuitry 234 may communicate with the non-volatile memory 206 via one or more of the data bus interface 212 and the C/A bus interface 214. For example, the memory interface circuitry 234 may prompt the C/A bus interface 214 to relay commands issued by the memory interface circuitry 234 over the C/A bus 236 to a local controller in the non-volatile memory 206. And the memory interface circuitry 234 may transmit to, or receive data from, the non-volatile memory 206 over the data bus 232. In some examples, the commands issued by the memory interface circuitry 234 may be supported by the non-volatile memory 206 but not the volatile memory 204 (e.g., the commands issued by the memory interface circuitry 234 may be different than the commands issued by the memory interface circuitry 240).

The memory interface circuitry 240 may communicate with the volatile memory 204 via one or more of the data bus interface 216 and the C/A bus interface 264. For example, the memory interface circuitry 240 may prompt the C/A bus interface 264 to relay commands issued by the memory interface circuitry 240 over the C/A bus 242 to a local controller of the volatile memory 204. And the memory interface circuitry 240 may transmit to, or receive data from, the volatile memory 204 over one or more data buses 238. In some examples, the commands issued by the memory interface circuitry 240 may be supported by the volatile memory 204 but not the non-volatile memory 206 (e.g., the commands issued by the memory interface circuitry 240 may be different than the commands issued by the memory interface circuitry 234).

Together, the components of the interface controller 202 may operate the non-volatile memory 206 as a main memory and the volatile memory 204 as a cache. Such operation may be prompted by one or more access commands (e.g., read/retrieval commands/requests and write/storage commands/requests) received from a host device.

In some examples, the interface controller 202 may receive a storage command from the host device. The storage command may be received over the C/A bus 226 and transferred to the command circuitry 230 via one or more of the C/A bus interface 210 and the decoder 228. The storage command may include or be accompanied by address bits that target a memory address of the non-volatile memory 206. The data to be stored may be received over the data bus 260 and transferred to the buffer 218 via the data bus interface 208. In a write-through mode, the interface controller 202 may transfer the data to both the non-volatile memory 206 and the volatile memory 204. In a write-back mode, in some example, the interface controller 202 may transfer the data to only the volatile memory 204.

In either mode, the interface controller 202 may first check to see if the volatile memory 204 has space in memory cells available to store the data. To do so, the command circuitry 230 may reference the memory array 252 (e.g., using a set of the memory address bits) to determine whether one or more of the n sets (e.g., row) of volatile memory cells associated with the memory address are empty (e.g., store random or invalid data) or whether one or more of then sets (e.g., row) of volatile memory cells associated with the memory address are full (e.g., store valid data). For example, the command circuitry 230 may determine whether one or more of the n sets (e.g., rows) of volatile memory cells is available (or is unavailable) based on tag information and validity information stored in the memory array 252. In some cases, a set of volatile memory cells in the volatile memory 204 may be referred to as a line, cache line, or row.

If one of then associated sets of volatile memory cells is available for storing information, the interface controller 202 may transfer the data from the buffer 218 to the volatile memory 204 for storage in that set of volatile memory cells. But if no associated sets of volatile memory cells are empty, the interface controller 202 may initiate an eviction process to make room for the data in the volatile memory 204. The eviction process may involve transferring the victim data from one of then associated sets of volatile memory cells to the buffer 220. The dirty information for the victim data may be transferred from the memory array 254 to the register 258 for identification of dirty subsets of the victim data. After the victim data is stored in the buffer 220, the new data can be transferred from the buffer 218 to the volatile memory 204 and the victim data can be transferred from the buffer 220 to the non-volatile memory 206. In some cases, dirty subsets of the old data may be transferred to the non-volatile memory 206 and clean subsets (e.g., unmodified subsets) may be discarded. The dirty subsets may be identified by the engine 246-b based on or in response to dirty information transferred from the memory array 254 to the register 258 during the eviction process.

In another example, the interface controller 202 may receive a command, such as a retrieval command, from the host device. The retrieval command may be received over the C/A bus 226 and transferred to the command circuitry 230 via one or more of the C/A bus interface 210 and the decoder 228. The retrieval command may include address bits that target a memory address of the non-volatile memory 206. Before attempting to access the targeted memory address of the non-volatile memory 206, the interface controller 202 may check to see if the volatile memory 204 stores the data. To do so, the command circuitry 230 may reference the memory array 252 (e.g., using a set of the memory address bits) to determine whether one or more of the n sets (e.g., rows) of volatile memory cells associated with the memory address stores the requested data (e.g., whether one or more of the n sets of volatile memory cells associated with the memory address stores the requested data or alternatively do not store the requested data). If the requested data is stored in the volatile memory 204, the interface controller 202 may transfer the requested data to the buffer 218 for transmission to the host device over the data bus 260.

If the requested data is not stored in the volatile memory 204 (e.g., the requested data may be stored in the non-volatile memory 206 or another location), the interface controller 202 may retrieve the data from the non-volatile memory 206 and transfer the data to the buffer 218 for transmission to the host device over the data bus 260. Additionally, the interface controller 202 may transfer the requested data from the buffer 218 to the volatile memory 204 so that the data can be accessed with a lower latency during a subsequent retrieval operation. Before transferring the requested data, however, the interface controller 202 may first determine whether one or more of the n associated sets of volatile memory cells is available to store the requested data (e.g., whether one or more of the n associated sets of volatile memory cells is empty or is full). The interface controller 202 may determine the availability of the n associated sets of volatile memory cells by communicating with the related cache management circuit set. If an associated set of volatile memory cells is available, the interface controller 202 may transfer the data in the buffer 218 to the volatile memory 204 without performing an eviction process. Otherwise, the interface controller 202 may transfer the data from the buffer 218 to the volatile memory 204 after performing an eviction process.

The memory subsystem 200 may be implemented in one or more configurations, including one-chip versions and multi-chip versions. A multi-chip version may include one or more constituents of the memory subsystem 200, including the interface controller 202, the volatile memory 204, and the non-volatile memory 206 (among other constituents or combinations of constituents), on a chip that is separate from a chip that includes one or more other constituents of the memory subsystem 200. For example, in one multi-chip version, respective separate chips may include each of the interface controller 202, the volatile memory 204, and the non-volatile memory 206. In contrast, a one-chip version may include the interface controller 202, the volatile memory 204, and the non-volatile memory 206 on a single chip.

To ensure power-efficient transitions between power modes, the interface controller 202 may control the power mode of the volatile memory 204 separate from the power mode of the non-volatile memory 206. Because more commands are expected to be satisfied by the volatile memory 204 than the non-volatile memory 206 (given the high hit-to-miss ratio of the memory subsystem 200), the interface controller 202 may control the power mode of the volatile memory 204 in accordance with the expectations of the host device (e.g., based on or in response to power mode commands from the host device). However, because the host device is unaware of the non-volatile memory 206, the interface controller 202 may control the power mode of the non-volatile memory 206 based on or in accordance with, among other examples, the access needs of the interface controller 202 (e.g., based on or in response to the quantity of queued commands for the non-volatile memory 206, among other factors).

Figure 3:
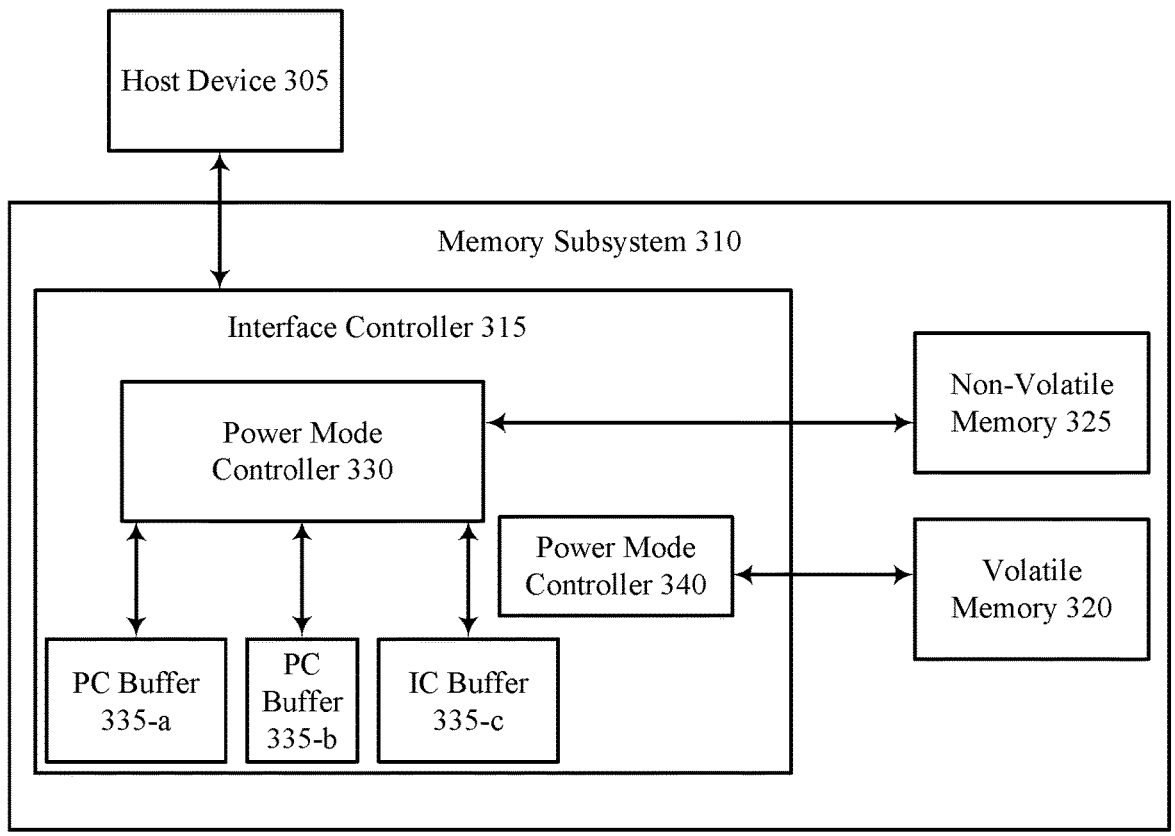
FIG. 3 illustrates an example of a device that supports power mode control in a multi-memory device in accordance with examples as disclosed herein.

FIG. 3 illustrates an example of a system 300 that supports multi-memory power mode control in accordance with examples as disclosed herein. The system 300 may include a host device 305 and a memory subsystem 310 and may be an example of a system 100 as described with reference to FIG. 1. The memory subsystem 310 may include an interface controller 315, a volatile memory 320, and a non-volatile memory 325, which may be coupled with one another via one or more transmission lines, buses, or both. The interface controller 315 may include a power mode controller 330 and one or more command buffers 335. As described herein, interface controller 315 may control the power modes of the volatile memory 320 and the non-volatile memory 325 independent from each other. For example, the interface controller 315 may control the power mode of the volatile memory 320 based on (e.g., responsive to) power mode commands from the host device 305 and control the power mode of the non-volatile memory 325 based on or in response to the quantity of commands queued in the buffers 335 for the non-volatile memory 325, among other factors.

The interface controller 315 may receive one or more commands from the host device 305, including functional (or "access") commands and power mode commands, among other commands. A functional command may refer to a command that causes access to a memory, such as an activate command, a pre-charge command, a read command, a write command, and the like. A power mode command may refer to a command that indicates a power mode. The interface controller 315 may also transmit one or more commands to the volatile memory 320 and the non-volatile memory 325, including functional commands and power mode commands, among other commands. The interface controller 315 may include a power mode controller 330, a pending command (PC) buffer 335-a, a pending command buffer 335-b, and an issued command buffer 335-c, among other components.

The power mode controller 340 may be configured for managing the power mode of volatile memory 320. The power mode controller 340 may change the power mode of the volatile memory 320 based on (e.g., responsive to) power mode commands from the host device 305. For example, upon receipt of a power mode command from the host device 305, the power mode controller 340 may transition the volatile memory 320 from one power mode to the power mode indicated by the power mode command (e.g., by the power mode controller 340 sending a command or an indication, such as a new power mode command, to the volatile memory 320).

The power mode controller 330 may be configured for managing the power mode of non-volatile memory 325. The power mode controller 330 may be coupled with and exchange signaling with the pending command buffer 335-a, the pending command buffer 335-b, and the issued command buffer 335-c, among other components. For example, the power mode controller 330 may receive commands from one or more of the buffers 335 as well as indications of the quantity of commands queued (or "buffered," or "stored," among other suitable terminology) in the buffers 335. The power mode controller 330 may use the quantity of queued commands as a basis for controlling the power mode of the non-volatile memory 325, among other factors.

The pending command buffer 335-a may store commands (e.g., functional commands) for the non-volatile memory 325. In some examples, the pending command buffer 335-a is included in or coupled with a scheduling component of the memory interface circuitry 234.

The pending command buffer 335-b may be a smaller buffer (relative to the pending command buffer 335-a) that stores commands from the pending command buffer 335-a. The pending command buffer 335-b may be configured for ensuring that various parameters, such as timing parameters, are satisfied for the non-volatile memory 325. So, commands in the pending command buffer 335-a that are ready for the non-volatile memory 325 may be communicated from the pending command buffer 335-a to the pending command buffer 335-b so that the pending command buffer 335-a can relay the commands to the non-volatile memory 325 (or an intermediate component) in an appropriate manner.

In some examples, the pending command buffer 335-a and the pending command buffer 335-b may be combined into a single buffer. In some examples, the pending command buffer 335-a may be referred to a scheduling buffer and the pending command buffer 335-b may be referred to as an input queue. The pending command buffer 335-a and the pending command buffer 335-b may be configured to indicate (e.g., to the power mode controller 330) the quantity of commands stored in that buffer for the non-volatile memory 325.

The issued command buffer 335-c may store commands that have been issued to the non-volatile memory 325 but not yet satisfied (e.g., the commands may be commands that that the non-volatile memory 325 is in the process of satisfying or executing). The power mode controller 330 may reference the issued command buffer 335-c to determine whether the non-volatile memory 325 is busy (e.g., is performing one or more operations) or is idle (e.g., is not performing one or more operations), which may allow the power mode controller to 330 to avoid changing the power mode of the non-volatile memory 325 at an inappropriate time (e.g., which the non-volatile memory 325 is in the middle of a task). In some examples, the issued command buffer 335-c may be referred to as a read-response buffer.

In response to receiving a power mode command from the host device 305, the interface controller 315 may (e.g., via the power mode controller 340) change the power mode of the volatile memory 320 (e.g., to be the power mode indicated by the power mode command). For example, the power mode controller 340 may issue a command or send an indication, such as a new power mode command, to the volatile memory 320, thereby effectuating the change in power modes. Thus, the volatile memory 320 may be in the power mode expected by the host device 305 for subsequent commands (e.g., functional commands).

In some examples, the power mode controller 330 may maintain the power mode of the non-volatile memory 325 as-is despite the power mode command from the host device 305 (and despite the change in power mode for the volatile memory 320). For example, the power mode controller 330 may keep the non-volatile memory 325 in a standby (or active) mode despite the power mode command indicating the low power mode. In other examples, the power mode controller 330 may comply with a power command after a delay. For example, in response to a power command that indicates a higher power mode, the power mode controller 330 may delay transitioning the non-volatile memory 325 from the low power mode to the higher power mode until a threshold quantity of commands are queued for the non-volatile memory 325.

Thus, the power mode controller 330 may use the quantity of queued commands for the non-volatile memory 325 as a basis for changing the power mode of the non-volatile memory. The power mode controller 330 may determine the quantity of queued commands for the non-volatile memory 325 based on or in response to the quantity of commands in the pending command buffer 335-a, the quantity of commands in the pending command buffer 335-b, the quantity of commands in the issued command buffer 335-c, or a combination thereof.

If the quantity of queued commands is less than a threshold quantity (e.g., if the quantity of queued commands is zero), the power mode controller 330 may transition the non-volatile memory 325 from a higher power mode (e.g., a standby mode, an active mode) to a lower power mode. Such a technique may reduce the power consumption of the non-volatile memory 325 by allowing the non-volatile memory 325 to transition to a lower power mode if there is a break in accessing the non-volatile memory 325. If the quantity of queued commands satisfies a threshold quantity (e.g., if the quantity of queued commands is one or more), the power mode controller 330 may transition the non-volatile memory from a lower power mode to a higher power mode (e.g., a standby mode, an active mode). Such a technique may reduce the power consumption of the non-volatile memory 325 by allowing the non-volatile memory 325 to delay a transition to a higher power mode, in some examples, until the non-volatile memory 325 needs to be accessed (e.g., in the event of a miss). Put another way, the non-volatile memory 325 may transition to the higher power mode upon one or more functional commands associated with one or more misses being added to the pending command buffer 335-a.

In some examples, the power mode controller 330 may delay a power mode transition until a duration (e.g., relative to the transition trigger) has expired. For example, upon detecting that some quantity of commands, such as zero commands, are queued for the non-volatile memory 325, the power mode controller 330 may wait a configurable delay before transitioning the non-volatile memory 325 from a first power mode to a second power mode, such as a higher power mode to a lower power mode. Such a technique may prevent the power mode controller 330 from immediately re-transitioning the power mode of the non-volatile memory 325 in the event of another trigger event, which may waste power, increase latency, or both, among other disadvantages. In some examples, the duration may be indicated by a register included in the interface controller 315 (e.g., coupled with the power mode controller 330). In some examples, the register may indicate a duration for different power mode transition combinations (defined with respect to the power mode exited and the power mode entered). For example, the register may indicate a first duration for transitioning from the standby mode to the low power mode and may indicate a second duration for transitioning from the active mode to the low power mode (and so on and so forth for other transition combinations). The delay(s) indicated by the register may be set by user, set by the host device 305, set by the interface controller 315 (e.g., based on an access pattern of the non-volatile memory 325, a power level of the memory subsystem 310), or a combination thereof.

Figure 4:
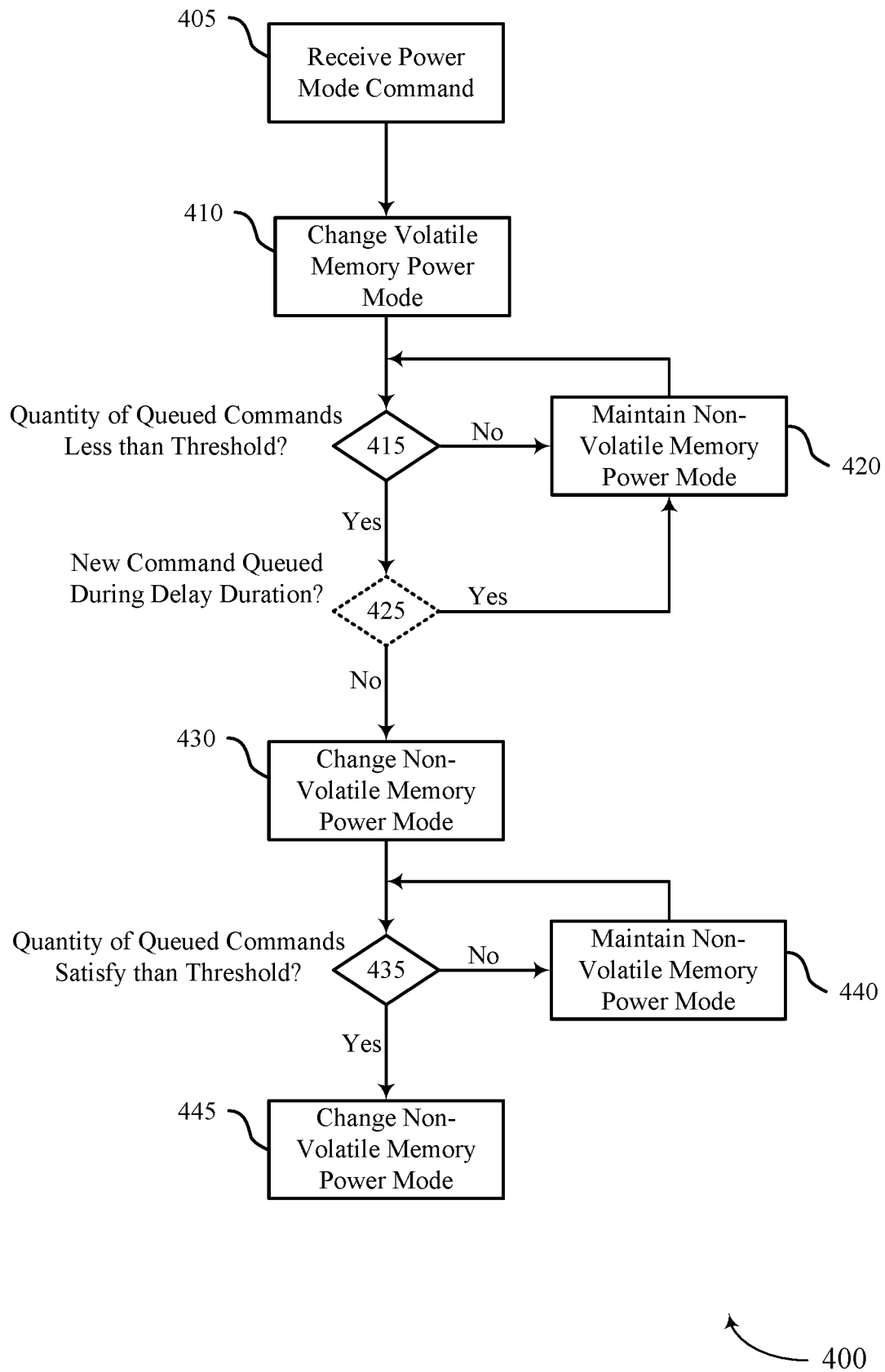
FIG. 4 illustrates an example of a process flow that supports power mode control in a multi-memory device in accordance with examples as disclosed herein.

FIG. 4 illustrates an example of a process flow 400 that supports multi-memory power mode control in accordance with examples as disclosed herein. Process flow 400 may be implemented by a memory subsystem 110 or an interface controller 115 as described with reference to FIG. 1, a memory subsystem 200 or an interface controller 202 as described with reference to FIG. 2, or a memory subsystem 310 or an interface controller 315 as described with reference to FIG. 3. However, other types of devices or components may implement process flow 400. The process flow 400 may illustrate the operations of a device that changes the power mode of a volatile memory independent of the power mode of a non-volatile memory, and vice versa.

For ease of reference, the process flow 400 is described with reference to a device. For example, aspects of the process flow 400 may be implemented by a device that includes a volatile memory and a non-volatile memory. Additionally or alternatively, aspects of the process flow 400 may be implemented as instructions stored in memory (e.g., firmware stored in the volatile memory 120 or the non-volatile memory 125 or both). For example, the instructions, if executed by a controller, may cause the controller to perform the operations of the process flow 400.

At 405, a command such as a power mode command may be received. For example, the interface controller 315 may receive a power mode command from the host device 305. The power mode command may indicate a low power mode requested by the host device 305. At 410, the power mode of the volatile memory 320 may be changed based on (e.g., responsive to) the power mode command. For example, the interface controller 315 may change the power mode of the volatile memory 320 from a first power mode, such as a higher power mode (e.g., an active mode, a standby mode), to a second power mode, such as a low power mode one or both of which may be indicated by the power mode command. Thus, after 410, the volatile memory 320 may be operated in the low power mode (at least until another power mode command is received or some other power mode transition event occurs). However, the power mode of the non-volatile memory 325 may be maintained (e.g., in the current power mode) irrespective of the power mode command 405.

At 415, it may be determined whether a quantity of queued commands is less than a threshold quantity (e.g., one) or not. For example, the interface controller 315 may determine whether the quantity of queued commands for the non-volatile memory 325 is less than the threshold quantity (e.g., is zero). The quantity of queued commands may be determined based on or in response to the quantity of pending commands stored (or "queued") in the pending command buffer 335-a, based on or in response to the quantity of pending commands stored in the pending command buffer 335-b, based on or in response to the quantity of issued commands stored in the issued command buffer 335-c, or based on or in response to a combination of two or more of these quantities. In some examples, the quantity of queued commands may be determined based on or in response to indications of the quantities received from the buffers 335.

If, at 415, it is determined that the quantity of queued commands is less than the threshold quantity (e.g., the quantity of queued commands is zero), the device may proceed to 420 and maintain the power mode of the non-volatile memory 325 as-is before returning to 415. If, at 415, it is determined that the quantity of queued commands is not less than the threshold quantity (e.g., the quantity of queued commands is one or more), the device may proceed to 425.

At 425, it may be determined whether a new command has been queued (e.g., added to one of the buffers 335) for the non-volatile memory 325 during a delay duration relative to the determination at 415. For example, the interface controller 315 may determine whether a new command has been queued for the non-volatile memory 325 in the pending command buffer 335-a. The delay duration may be indicated by a register that is configured to indicate the delay duration. The delay duration may be set (or updated) by a user (in which case the delay duration may be referred to as being based on or in response to a user input), set (or updated) by the host device 305, set (or updated) by the interface controller 315, or set (or updated) by a combination thereof. In some examples, the interface controller 315 may set the delay duration based on or in response to an access pattern (e.g., an access history) of the non-volatile memory 325. In some examples, the interface controller 315 may set the delay duration based on or in response to a power level of the non-volatile memory 325. In some examples, the interface controller 315 may determine whether to use the delay duration based on or in response to the last one or more commands issued to the non-volatile memory 325.

If, at 425, it is determined that a new command has been queued for the non-volatile memory 325 during the delay duration, the interface controller 315 may proceed to 420 and maintain the power mode of the non-volatile memory 325 as-is. If, at 425, it is determined that a new command has not been queued for the non-volatile memory 325 during the delay duration, the interface controller 315 may proceed to 430.

At 430, the power mode the non-volatile memory 325 may be changed. For example, the interface controller 315 may transition the non-volatile memory 325 from a higher power mode to the low power mode. The transition to the low power mode may be based on or in response to the determinations at 415 and 420 and irrespective of the power command received at 405.

At 435, it may be determined whether the quantity of queued commands satisfies (e.g., is greater than or equal to) the threshold quantity. For example, the interface controller 315 may determine whether the quantity of queued commands for the non-volatile memory 325 satisfies the threshold quantity (e.g., by comparing the quantity of queued commands for the non-volatile memory 325 with the threshold quantity that may be stored or otherwise calculated or available).

If, at 435, it is determined that the quantity of queued commands does not satisfy the threshold quantity (e.g., the quantity of queued commands is zero), the device may proceed to 440 and maintain the power mode of the non-volatile memory 325 as-is before returning to 435. If, at 435, it is determined that the quantity of queued commands satisfies the threshold quantity (e.g., the quantity of queued commands is one or more), the device may proceed to 445.

At 445, the power mode the non-volatile memory 325 may be changed. For example, the interface controller 315 may transition the non-volatile memory 325 from the low power mode to a higher power mode. The transition to the higher power mode may be based on or in response to the determination at 435. In some examples, the transition to the higher power mode is also based on or in response to a power mode command (e.g., received before 435) that indicates the higher power mode. If transitioning from the low power mode to a higher power mode, the device may not use a delay duration to delay transition because doing so may increase the latency of the non-volatile memory 325 for access operations.

Although shown occurring before the operations at 415, in some examples, the operations at 405 and 410 may occur after the operations at 430. Thus, in some examples the power mode of the non-volatile memory 325 is changed to the low power mode before the power mode of the volatile memory 320 is changed to the low power mode.

Thus, the device may change the power mode of the volatile memory independent of the power mode of the non-volatile memory, and vice versa.

Alternative examples of the foregoing may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

Figure 5:
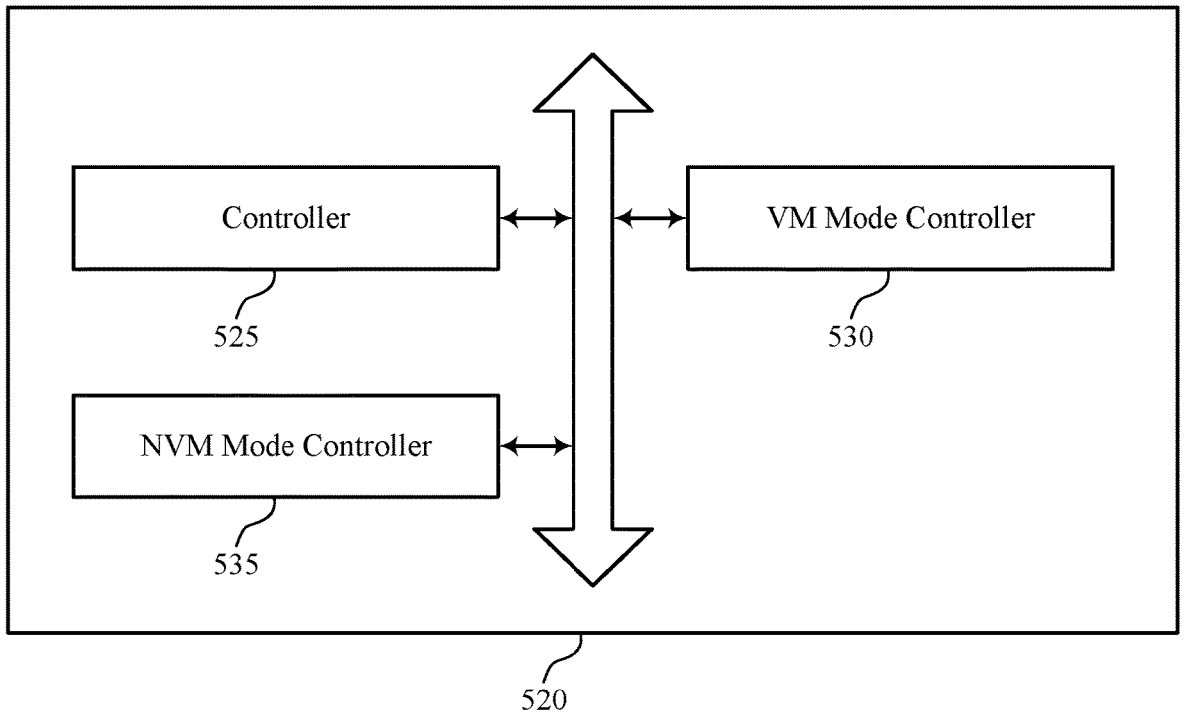
FIG. 5 shows a block diagram of a memory device that supports power mode control in a multi-memory device in accordance with examples as disclosed herein.

FIG. 5 shows a block diagram 500 of a memory device 520 that supports power mode control in a multi-memory device in accordance with examples as disclosed herein. The memory device 520 may be an example of aspects of a memory device as described with reference to FIGS. 1 through 4. The memory device 520, or various components thereof, may be an example of means for performing various aspects of power mode control in a multi-memory device as described herein. For example, the memory device 520 may include a controller 525, a volatile memory (VM) controller 530, a non-volatile memory (NVM) controller 535, or any combination thereof. Each of these components may communicate, directly or indirectly, with one another (e.g., via one or more buses).

The controller 525 may be or include logic, circuitry, a processor, a controller, or other components capable of performing the functions described herein. In some examples the controller 525 is an example of an interface controller as described herein. The VM controller 530 may be or include logic, circuitry, a processor, a controller, or other components capable of performing the functions described herein. In some examples the VM controller 530 is an example of a power mode controller 340 as described with reference to FIG. 3. The NVM controller 535 may be or include logic, circuitry, a processor, a controller, or other components capable of performing the functions described herein. In some examples the NVM controller 535 is an example of a power mode controller 330 as described with reference to FIG. 3.

The controller 525 may be configured as or otherwise support a means for operating a volatile memory in a first power mode and a non-volatile memory in a second power mode. The VM controller 530 may be configured as or otherwise support a means for transitioning the volatile memory from the first power mode to a third power mode based at least in part on (e.g., in response to) a command from a host device coupled with the memory device, the command indicating the third power mode. The NVM controller 535 may be configured as or otherwise support a means for transitioning the non-volatile memory from the second power mode to a fourth power mode that consumes less power than the second power mode irrespective of the command from the host device and based at least in part on (e.g., in response to) a quantity of queued commands for the non-volatile memory being less than a threshold quantity.

In some examples, the NVM controller 535 may be configured as or otherwise support a means for determining whether the quantity of queued commands for the non-volatile memory is less than the threshold quantity. In some examples, the NVM controller 535 may be configured as or otherwise support a means for transmitting to the non-volatile memory a command indicating the fourth power mode based at least in part on determining that the quantity of queued commands is less than the threshold quantity, where the non-volatile memory is transitioned to the fourth power mode based at least in part on transmitting the command indicating the fourth power mode.

In some examples, the NVM controller 535 may be configured as or otherwise support a means for determining a first quantity of pending commands for the non-volatile memory stored in a first buffer, where the quantity of queued commands includes the first quantity of pending commands. In some examples, the NVM controller 535 may be configured as or otherwise support a means for determining a second quantity of issued commands for the non-volatile memory stored in a second buffer, where the quantity of queued commands includes the second quantity of issued commands.

In some examples, the NVM controller 535 may be configured as or otherwise support a means for determining a third quantity of pending commands for the non-volatile memory stored in a third buffer, where the quantity of queued commands includes the third quantity of pending commands.

In some examples, the NVM controller 535 may be configured as or otherwise support a means for determining, after transitioning the non-volatile memory to the fourth power mode, whether the quantity of queued commands for the non-volatile memory satisfies the threshold quantity. In some examples, the NVM controller 535 may be configured as or otherwise support a means for transitioning the non-volatile memory from the fourth power mode to different power mode that consumes more power than the fourth power mode based at least in part on the quantity of queued commands for the non-volatile memory satisfying the threshold quantity.

In some examples, the NVM controller 535 may be configured as or otherwise support a means for determining, based at least in part on a user input, an access pattern of the non-volatile memory, or combination thereof, to delay a duration between transitioning the non-volatile memory from the second power mode to the fourth power mode, where the non-volatile memory is transitioned after the duration.

In some examples, the NVM controller 535 may be configured as or otherwise support a means for determining whether a quantity of queued commands for a non-volatile memory is less than a threshold quantity, where the quantity of queued commands includes commands pending for the non-volatile memory and commands issued to the non-volatile memory. In some examples, the NVM controller 535 may be configured as or otherwise support a means for transitioning the non-volatile memory from a first power mode to a second power mode that consumes less power than the first power mode based at least in part on (e.g., in response to) determining that the quantity of queued commands for the non-volatile memory is less than the threshold quantity.

In some examples, the NVM controller 535 may be configured as or otherwise support a means for determining, after transitioning the non-volatile memory to the second power mode, whether the quantity of queued commands for the non-volatile memory satisfies the threshold quantity. In some examples, the NVM controller 535 may be configured as or otherwise support a means for transitioning the non-volatile memory from the second power mode to a different power mode that consumes more power than the second power mode based at least in part on determining that the quantity of queued commands for the non-volatile memory satisfies the threshold quantity.

In some examples, the NVM controller 535 may be configured as or otherwise support a means for delaying a duration between determining that the quantity of queued commands is less than the threshold quantity and transitioning the non-volatile memory from the first power mode to the second power mode, where the delay is based at least in part on a user input, an access pattern of the non-volatile memory, or a combination thereof.

In some examples, the VM controller 530 may be configured as or otherwise support a means for receiving a command, from a host device, that indicates a power mode for the volatile memory. In some examples, the NVM controller 535 may be configured as or otherwise support a means for maintaining the power mode of the non-volatile memory irrespective of receiving the command that indicates the power mode for the volatile memory.

Figure 6:
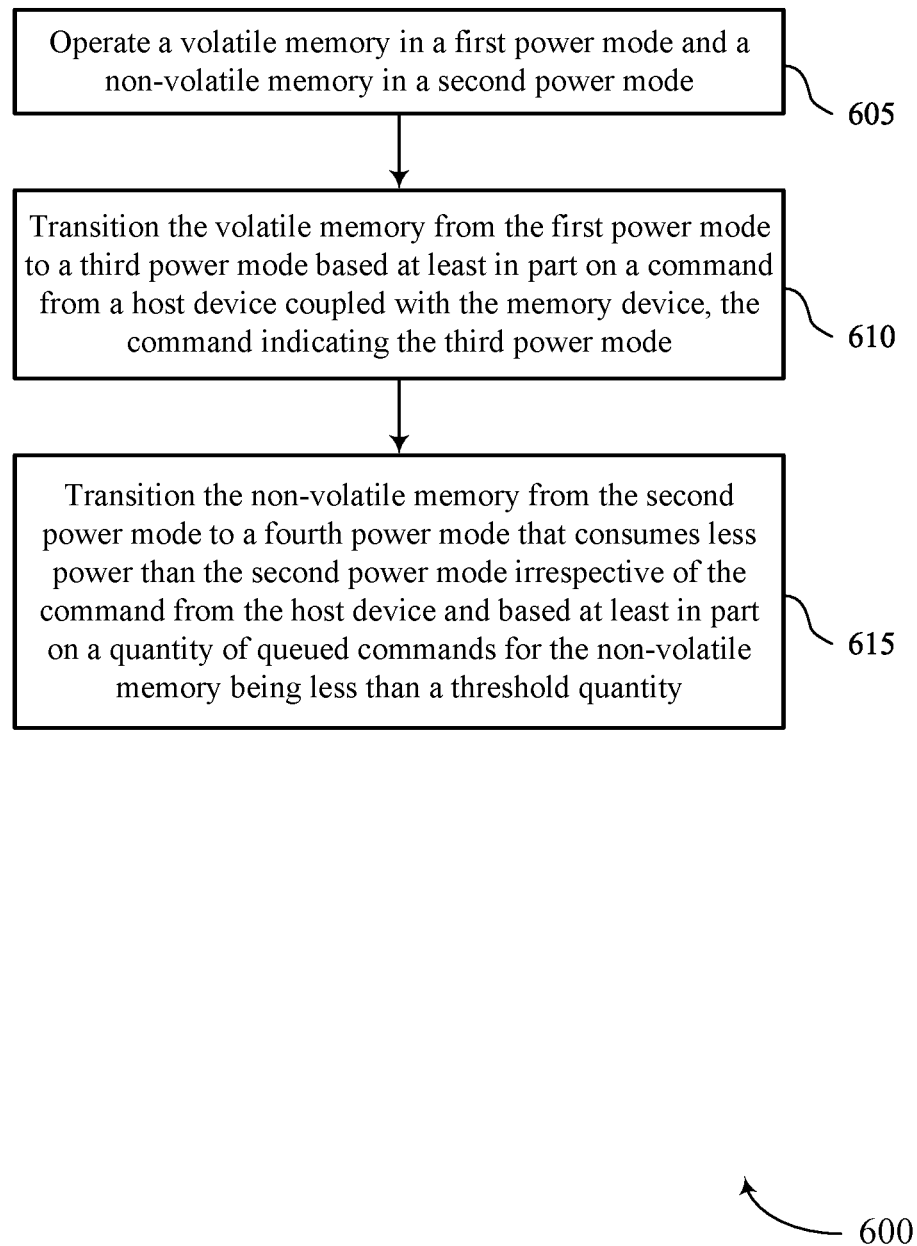
FIGS. 6 and 7 show flowcharts illustrating a method or methods that support power mode control in a multi-memory device in accordance with examples as disclosed herein.

FIG. 6 shows a flowchart illustrating a method 600 that supports power mode control in a multi-memory device in accordance with examples as disclosed herein. The operations of method 600 may be implemented by a memory device or its components as described herein. For example, the operations of method 600 may be performed by a memory device as described with reference to FIGS. 1 through 5. In some examples, a memory device may execute a set of instructions to control the functional elements of the device to perform the described functions. Additionally or alternatively, the memory device may perform aspects of the described functions using special-purpose hardware.

At 605, the method may include operating a volatile memory in a first power mode and a non-volatile memory in a second power mode. The operations of 605 may be performed in accordance with examples as disclosed herein. In some examples, aspects of the operations of 605 may be performed by a controller 525 as described with reference to FIG. 5.

At 610, the method may include transitioning the volatile memory from the first power mode to a third power mode based at least in part on a command from a host device coupled with the memory device, the command indicating the third power mode. The operations of 610 may be performed in accordance with examples as disclosed herein. In some examples, aspects of the operations of 610 may be performed by a VM controller 530 as described with reference to FIG. 5.

At 615, the method may include transitioning the non-volatile memory from the second power mode to a fourth power mode that consumes less power than the second power mode irrespective of the command from the host device and based at least in part on a quantity of queued commands for the non-volatile memory being less than a threshold quantity. The operations of 615 may be performed in accordance with examples as disclosed herein. In some examples, aspects of the operations of 615 may be performed by an NVM controller 535 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for operating a volatile memory in a first power mode and a non-volatile memory in a second power mode, transitioning the volatile memory from the first power mode to a third power mode based at least in part on a command from a host device coupled with the memory device, the command indicating the third power mode, and transitioning the non-volatile memory from the second power mode to a fourth power mode that consumes less power than the second power mode irrespective of the command from the host device and based at least in part on a quantity of queued commands for the non-volatile memory being less than a threshold quantity.

Some examples of the method 600 and the apparatus described herein may further include operations, features, circuitry, logic, means, or instructions for determining whether the quantity of queued commands for the non-volatile memory may be less than the threshold quantity and transmitting to the non-volatile memory a command indicating the fourth power mode based at least in part on determining that the quantity of queued commands may be less than the threshold quantity, where the non-volatile memory may be transitioned to the fourth power mode based at least in part on transmitting the command indicating the fourth power mode.

Some examples of the method 600 and the apparatus described herein may further include operations, features, circuitry, logic, means, or instructions for determining a first quantity of pending commands for the non-volatile memory stored in a first buffer, where the quantity of queued commands includes the first quantity of pending commands and determining a second quantity of issued commands for the non-volatile memory stored in a second buffer, where the quantity of queued commands includes the second quantity of issued commands.

Some examples of the method 600 and the apparatus described herein may further include operations, features, circuitry, logic, means, or instructions for determining a third quantity of pending commands for the non-volatile memory stored in a third buffer, where the quantity of queued commands includes the third quantity of pending commands.

Some examples of the method 600 and the apparatus described herein may further include operations, features, circuitry, logic, means, or instructions for determining, after transitioning the non-volatile memory to the fourth power mode, whether the quantity of queued commands for the non-volatile memory satisfies the threshold quantity and transitioning the non-volatile memory from the fourth power mode to different power mode that consumes more power than the fourth power mode based at least in part on the quantity of queued commands for the non-volatile memory satisfying the threshold quantity.

Some examples of the method 600 and the apparatus described herein may further include operations, features, circuitry, logic, means, or instructions for determining, based at least in part on a user input, an access pattern of the non-volatile memory, or combination thereof, to delay a duration between transitioning the non-volatile memory from the second power mode to the fourth power mode, where the non-volatile memory may be transitioned after the duration.

Figure 7:
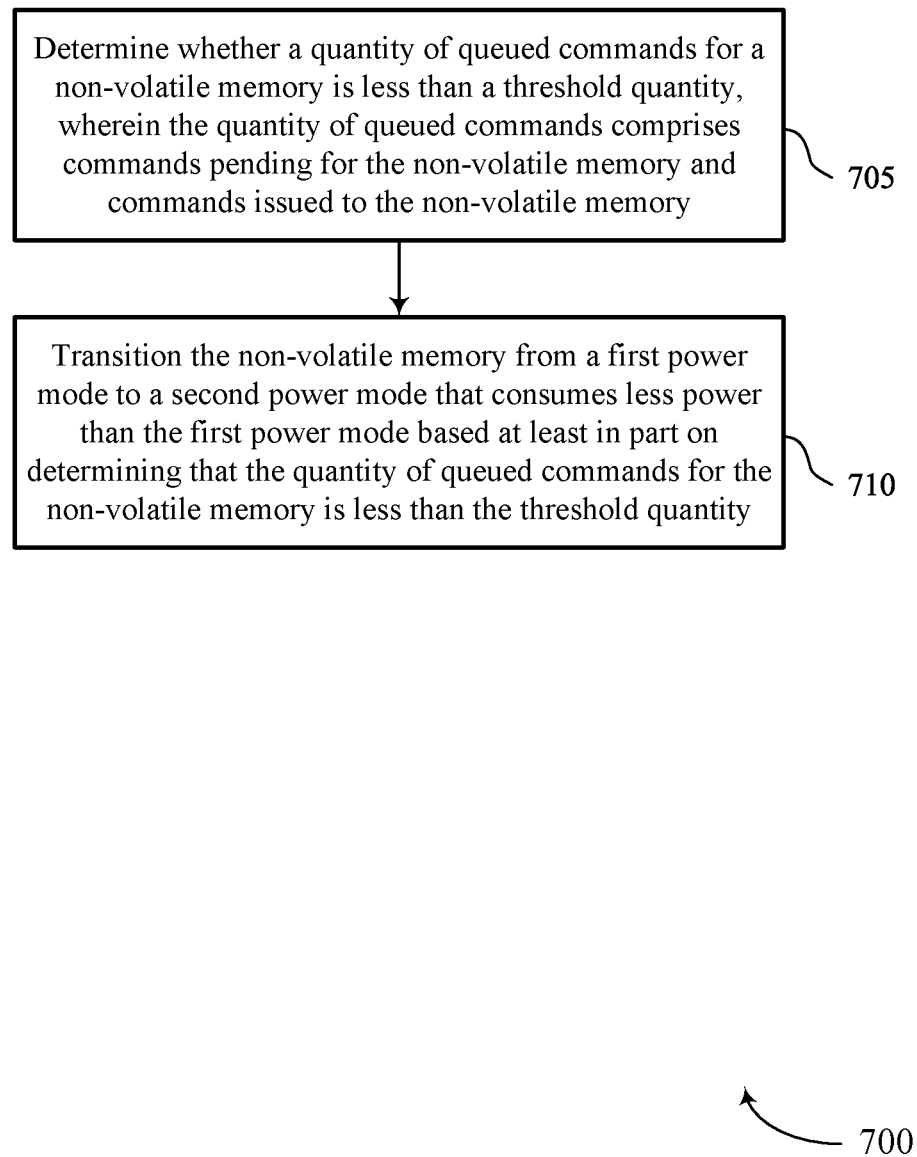

FIG. 7 shows a flowchart illustrating a method 700 that supports power mode control in a multi-memory device in accordance with examples as disclosed herein. The operations of method 700 may be implemented by a memory device or its components as described herein. For example, the operations of method 700 may be performed by a memory device as described with reference to FIGS. 1 through 5. In some examples, a memory device may execute a set of instructions to control the functional elements of the device to perform the described functions. Additionally or alternatively, the memory device may perform aspects of the described functions using special-purpose hardware.

At 705, the method may include determining whether a quantity of queued commands for a non-volatile memory is less than a threshold quantity, where the quantity of queued commands includes commands pending for the non-volatile memory and commands issued to the non-volatile memory. The operations of 705 may be performed in accordance with examples as disclosed herein. In some examples, aspects of the operations of 705 may be performed by an NVM controller 535 as described with reference to FIG. 5.

At 710, the method may include transitioning the non-volatile memory from a first power mode to a second power mode that consumes less power than the first power mode based at least in part on determining that the quantity of queued commands for the non-volatile memory is less than the threshold quantity. The operations of 710 may be performed in accordance with examples as disclosed herein. In some examples, aspects of the operations of 710 may be performed by an NVM controller 535 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor) for determining whether a quantity of queued commands for a non-volatile memory is less than a threshold quantity, where the quantity of queued commands includes commands pending for the non-volatile memory and commands issued to the non-volatile memory and transitioning the non-volatile memory from a first power mode to a second power mode that consumes less power than the first power mode based at least in part on determining that the quantity of queued commands for the non-volatile memory is less than the threshold quantity.

Some examples of the method 700 and the apparatus described herein may further include operations, features, circuitry, logic, means, or instructions for determining, after transitioning the non-volatile memory to the second power mode, whether the quantity of queued commands for the non-volatile memory satisfies the threshold quantity and transitioning the non-volatile memory from the second power mode to a different power mode that consumes more power than the second power mode based at least in part on determining that the quantity of queued commands for the non-volatile memory satisfies the threshold quantity.

Some examples of the method 700 and the apparatus described herein may further include operations, features, circuitry, logic, means, or instructions for delaying a duration between determining that the quantity of queued commands may be less than the threshold quantity and transitioning the non-volatile memory from the first power mode to the second power mode, where the delay may be based at least in part on a user input, an access pattern of the non-volatile memory, or a combination thereof.

Some examples of the method 700 and the apparatus described herein may further include operations, features, circuitry, logic, means, or instructions for receiving a command, from a host device, that indicates a power mode for the volatile memory and maintaining the power mode of the non-volatile memory irrespective of receiving the command that indicates the power mode for the volatile memory.

It should be noted that the methods described herein describe possible implementations, and that the operations and the steps may be rearranged or otherwise modified and that other implementations are possible. Further, portions from two or more of the methods may be combined.

An apparatus is described. The apparatus may include a non-volatile memory, a volatile memory configured to operate as a cache for the non-volatile memory, an interface controller coupled with the non-volatile memory and the volatile memory, the interface controller operable to cause the apparatus to, determine whether a quantity of queued commands for the non-volatile memory is less than a threshold quantity, where the quantity of queued commands includes commands pending for the non-volatile memory and commands issued to the non-volatile memory, and transition the non-volatile memory from a first power mode to a second power mode that consumes less power than the first power mode based at least in part on determining that the quantity of queued commands for the non-volatile memory is less than the threshold quantity In some examples, the apparatus may include a first buffer, in the interface controller, configured to store pending commands for the non-volatile memory, where the interface controller may be operable to cause the apparatus to determine the quantity of queued commands based at least in part on the pending commands stored in the first buffer and a second buffer, in the interface controller, configured to store issued commands for the non-volatile memory, where the interface controller may be operable to cause the apparatus to determine the quantity of queued commands based at least in part on the issued commands stored in the second buffer.

In some examples, the apparatus may include a third buffer, in the interface controller, configured to store a set of pending commands from the first buffer, where the interface controller may be operable to cause the apparatus to determine the quantity of queued commands based at least in part on the pending commands stored in the third buffer.

In some examples, the apparatus may include determine, after transitioning the non-volatile memory to the second power mode, whether the quantity of queued commands for the non-volatile memory satisfies the threshold quantity and transition the non-volatile memory from the second power mode to a different power mode that consumes more power than the second power mode based at least in part on determining that the quantity of queued commands for the non-volatile memory satisfies the threshold quantity.

In some examples, the apparatus may include delay a duration between determining that the quantity of queued commands may be less than the threshold quantity and transitioning the non-volatile memory from the first power mode to the second power mode, where the delay may be based at least in part on a user input, an access pattern of the non-volatile memory, or a combination thereof.

In some examples, the apparatus may include a register, in the interface controller, configured to indicate the duration the interface controller may be to delay between determining that the quantity of queued commands may be less than the threshold quantity and transitioning the non-volatile memory.

In some examples, the apparatus may include receive a command, from a host device, that indicates a power mode for the volatile memory and maintain the power mode of the non-volatile memory irrespective of receiving the command that indicates the power mode for the volatile memory. In some examples of the apparatus, the threshold quantity may be one and the quantity of queued commands may be zero.

Another apparatus is described. The apparatus may include a non-volatile memory, a volatile memory configured to operate as a cache for the non-volatile memory, an interface controller coupled with the non-volatile memory and the volatile memory, the interface controller operable to cause the apparatus to, operate the volatile memory in a first power mode and the non-volatile memory in a second power mode, transition the volatile memory from the first power mode to a third power mode based at least in part on a command from a host device, the command indicating the third power mode, and transition the non-volatile memory from the second power mode to a fourth power mode that consumes less power than the second power mode irrespective of the command from the host device and based at least in part on a quantity of queued commands for the non-volatile memory being less than a threshold quantity In some examples, the apparatus may include determine whether the quantity of queued commands for the non-volatile memory may be less than the threshold quantity and transmit to the non-volatile memory a command indicating the fourth power mode based at least in part on determining that the quantity of queued commands may be less than the threshold quantity, where the non-volatile memory may be transitioned to the fourth power mode based at least in part on transmitting the command indicating the fourth power mode.

In some examples, the apparatus may include determine a first quantity of pending commands for the non-volatile memory stored in a first buffer, where the quantity of queued commands may be determined based at least in part on the first quantity of pending commands and determine a second quantity of issued commands for the non-volatile memory stored in a second buffer, where the quantity of queued commands may be determined based at least in part on the second quantity of issued commands.

In some examples, the apparatus may include determine a third quantity of pending commands for the non-volatile memory stored in a third buffer, where the quantity of queued commands may be determined based at least in part on the third quantity of pending commands.

In some examples, the apparatus may include determine, after transitioning the non-volatile memory to the fourth power mode, whether the quantity of queued commands for the non-volatile memory satisfies the threshold quantity and transitioning the non-volatile memory from the fourth power mode to different power mode that consumes more power than the fourth power mode based at least in part on the quantity of queued commands for the non-volatile memory satisfying the threshold quantity.

In some examples, the apparatus may include determine, based at least in part on a user input, an access pattern of the non-volatile memory, or combination thereof, to delay a duration between transitioning the non-volatile memory from the second power mode to the fourth power mode, where the non-volatile memory may be transitioned after the duration.

In some examples of the apparatus, the volatile memory may be transitioned to the third power mode after the non-volatile memory may be transitioned to the fourth power mode. In some examples of the apparatus, the volatile memory and the non-volatile memory may be transitioned concurrently. In some examples, the apparatus may include receiving the command from the host device after transitioning the non-volatile memory to the fourth power mode. In some examples of the apparatus, the threshold quantity may be one and the quantity of queued commands may be zero.

It should be noted that the methods described above describe possible implementations, and that the operations and the steps may be rearranged or otherwise modified and that other implementations are possible. Furthermore, portions from two or more of the methods may be combined.

If used to describe a conditional action or process, the terms "if," "when," "based on," "based at least in part on," and "in response to," may be interchangeable.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

A protocol may define one or more communication procedures and one or more communication parameters supported for use by a device or component. For example, a protocol may define various operations, a timing and a frequency for those operations, a meaning of various commands or signals or both, one or more addressing scheme(s) for one or more memories, a type of communication for which pins are reserved, a size of data handled at various components such as interfaces, a data rate supported by various components such as interfaces, or a bandwidth supported by various components such as interfaces, among other parameters and metrics, or any combination thereof. Use of a shared protocol may enable interaction between devices because each device may operate in a manner expected, recognized, and understood by another device. For example, two devices that support the same protocol may interact according to the policies, procedures, and parameters defined by the protocol, whereas two devices that support different protocols may be incompatible.

To illustrate, two devices that support different protocols may be incompatible because the protocols define different addressing schemes (e.g., different quantities of address bits). As another illustration, two devices that support different protocols may be incompatible because the protocols define different transfer procedures for responding to a single command (e.g., the burst length or quantity of bytes permitted in response to the command may differ). Merely translating a command to an action should not be construed as use of two different protocols. Rather, two protocols may be considered different if corresponding procedures or parameters defined by the protocols vary. For example, a device may be said to support two different protocols if the device supports different addressing schemes, or different transfer procedures for responding to a command.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on or in response to the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, the term "substantially" means that the modified characteristic (e.g., a verb or adjective modified by the term substantially) need not be absolute but is close enough to achieve the advantages of the characteristic. As used herein, the term "concurrently" means that the described actions or phenomena occur during durations that at least partially overlap in time, that can occur at substantially the same time or be offset in time.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a non-volatile memory;
   a volatile memory configured to operate as a cache for the non-volatile memory; and
   an interface controller coupled with the non-volatile memory and the volatile memory, the interface controller operable to cause the apparatus to:
   determine whether a quantity of queued commands for the non-volatile memory is less than a threshold quantity, wherein the quantity of queued commands comprises commands pending for the non-volatile memory and commands issued to the non-volatile memory;
   transition the non-volatile memory from a first power mode to a second power mode that consumes less power than the first power mode based at least in part on determining that the quantity of queued commands for the non-volatile memory is less than the threshold quantity;
   receive a command, from a host device, that indicates a power mode for the volatile memory; and
   maintain the power mode of the non-volatile memory irrespective of receiving the command that indicates the power mode for the volatile memory.

2. The apparatus of claim 1, further comprising:
   a first buffer, in the interface controller, configured to store pending commands for the non-volatile memory, wherein the interface controller is operable to cause the apparatus to determine the quantity of queued commands based at least in part on the pending commands stored in the first buffer; and
   a second buffer, in the interface controller, configured to store issued commands for the non-volatile memory, wherein the interface controller is operable to cause the apparatus to determine the quantity of queued commands based at least in part on the issued commands stored in the second buffer.

3. An apparatus, comprising:
   a non-volatile memory;
   a volatile memory configured to operate as a cache for the non-volatile memory;
   an interface controller coupled with the non-volatile memory and the volatile memory;
   a first buffer, in the interface controller, configured to store pending commands for the non-volatile memory;
   a second buffer, in the interface controller, configured to store issued commands for the non-volatile memory; and a third buffer, in the interface controller, configured to store a set of pending commands from the first buffer, wherein the interface controller is operable to cause the apparatus to:
  determine a quantity of queued commands based at least in part on the pending commands stored in the first buffer, the issued commands stored in the second buffer, and the pending commands stored in the third buffer;
  determine whether the quantity of queued commands for the non-volatile memory is less than a threshold quantity; and
  transition the non-volatile memory from a first power mode to a second power mode that consumes less power than the first power mode based at least in part on determining that the quantity of queued commands for the non-volatile memory is less than the threshold quantity.

4. The apparatus of claim 1, wherein the interface controller is further operable to cause the apparatus to:
  determine, after transitioning the non-volatile memory to the second power mode, whether the quantity of queued commands for the non-volatile memory satisfies the threshold quantity; and
  transition the non-volatile memory from the second power mode to a different power mode that consumes more power than the second power mode based at least in part on determining that the quantity of queued commands for the non-volatile memory satisfies the threshold quantity.

5. The apparatus of claim 1, wherein the interface controller is further operable to cause the apparatus to:
  delay a duration between determining that the quantity of queued commands is less than the threshold quantity and transitioning the non-volatile memory from the first power mode to the second power mode, wherein delaying is based at least in part on a user input, an access pattern of the non-volatile memory, or a combination thereof.

6. The apparatus of claim 5, further comprising:
  a register, in the interface controller, configured to indicate the duration the interface controller is to delay between determining that the quantity of queued commands is less than the threshold quantity and transitioning the non-volatile memory.

7. The apparatus of claim 1, wherein the threshold quantity is one and the quantity of queued commands is zero.

8. An apparatus, comprising:
  a non-volatile memory;
  a volatile memory configured to operate as a cache for the non-volatile memory; and
  an interface controller coupled with the non-volatile memory and the volatile memory, the interface controller operable to cause the apparatus to:
    operate the volatile memory in a first power mode and the non-volatile memory in a second power mode;
    transition the volatile memory from the first power mode to a third power mode based at least in part on a command from a host device, the command indicating the third power mode; and
    transition the non-volatile memory from the second power mode to a fourth power mode that consumes less power than the second power mode irrespective of the command from the host device and based at least in part on a quantity of queued commands for the non-volatile memory being less than a threshold quantity.

9. The apparatus of claim 8, wherein the interface controller is further operable to cause the apparatus to:
  determine whether the quantity of queued commands for the non-volatile memory is less than the threshold quantity; and
  transmit to the non-volatile memory a second command indicating the fourth power mode based at least in part on determining that the quantity of queued commands is less than the threshold quantity, wherein the non-volatile memory is transitioned to the fourth power mode based at least in part on transmitting the second command indicating the fourth power mode.

10. The apparatus of claim 8, wherein the interface controller is further operable to cause the apparatus to:
  determine a first quantity of pending commands for the non-volatile memory stored in a first buffer, wherein the quantity of queued commands is determined based at least in part on the first quantity of pending commands; and
  determine a second quantity of issued commands for the non-volatile memory stored in a second buffer, wherein the quantity of queued commands is determined based at least in part on the second quantity of issued commands.

11. The apparatus of claim 10, wherein the interface controller is further operable to cause the apparatus to:
  determine a third quantity of pending commands for the non-volatile memory stored in a third buffer, wherein the quantity of queued commands is determined based at least in part on the third quantity of pending commands.

12. The apparatus of claim 8, wherein the interface controller is further operable to cause the apparatus to:
  determine, after transitioning the non-volatile memory to the fourth power mode, whether the quantity of queued commands for the non-volatile memory satisfies the threshold quantity; and
  transition the non-volatile memory from the fourth power mode to different power mode that consumes more power than the fourth power mode based at least in part on the quantity of queued commands for the non-volatile memory satisfying the threshold quantity.

13. The apparatus of claim 8, wherein the interface controller is further operable to cause the apparatus to:
  determine, based at least in part on a user input, an access pattern of the non-volatile memory, or combination thereof, to delay a duration between transitioning the non-volatile memory from the second power mode to the fourth power mode, wherein the non-volatile memory is transitioned after the duration.

14. The apparatus of claim 8, wherein the volatile memory is transitioned to the third power mode after the non-volatile memory is transitioned to the fourth power mode.

15. The apparatus of claim 8, wherein the volatile memory and the non-volatile memory are transitioned concurrently.

16. The apparatus of claim 8, wherein the interface controller is further operable to cause the apparatus to:
  receive the command from the host device after transitioning the non-volatile memory to the fourth power mode.

17. The apparatus of claim 8, wherein the threshold quantity is one and the quantity of queued commands is zero.

18. A method performed by a memory device, comprising:
  operating a volatile memory in a first power mode and a non-volatile memory in a second power mode;

transitioning the volatile memory from the first power mode to a third power mode based at least in part on a command from a host device coupled with the memory device, the command indicating the third power mode; and transitioning the non-volatile memory from the second power mode to a fourth power mode that consumes less power than the second power mode irrespective of the command from the host device and based at least in part on a quantity of queued commands for the non-volatile memory being less than a threshold quantity.

19. The method of claim 18, further comprising:
determining whether the quantity of queued commands for the non-volatile memory is less than the threshold quantity; and
transmitting to the non-volatile memory a second command indicating the fourth power mode based at least in part on determining that the quantity of queued commands is less than the threshold quantity, wherein the non-volatile memory is transitioned to the fourth power mode based at least in part on transmitting the second command indicating the fourth power mode.

20. The method of claim 18, further comprising:
determining a first quantity of pending commands for the non-volatile memory stored in a first buffer, wherein the quantity of queued commands comprises the first quantity of pending commands; and determining a second quantity of issued commands for the non-volatile memory stored in a second buffer, wherein the quantity of queued commands comprises the second quantity of issued commands.

21. The method of claim 20, further comprising:
determining a third quantity of pending commands for the non-volatile memory stored in a third buffer, wherein the quantity of queued commands comprises the third quantity of pending commands.

22. The method of claim 18, further comprising:
determining, after transitioning the non-volatile memory to the fourth power mode, whether the quantity of queued commands for the non-volatile memory satisfies the threshold quantity; and
transitioning the non-volatile memory from the fourth power mode to different power mode that consumes more power than the fourth power mode based at least in part on the quantity of queued commands for the non-volatile memory satisfying the threshold quantity.

23. The method of claim 18, further comprising:
determining, based at least in part on a user input, an access pattern of the non-volatile memory, or combination thereof, to delay a duration between transitioning the non-volatile memory from the second power mode to the fourth power mode, wherein the non-volatile memory is transitioned after the duration.

\* \* \* \* \*